United States Patent [19]

Spano

[11] 4,307,416
[45] Dec. 22, 1981

[54] TELEVISION SIGNAL MODIFICATION APPARATUS

[76] Inventor: John D. Spano, 301 Green Moor Pl., Thousand Oaks, Calif. 91360

[21] Appl. No.: 91,123

[22] Filed: Nov. 5, 1979

Related U.S. Application Data

[63] Continuation of Ser. No. 911,399, Jun. 1, 1978.

[51] Int. Cl.³ .............................................. H04N 7/16
[52] U.S. Cl. .................................... 358/124; 358/123
[58] Field of Search ........................ 358/120, 123, 124

[56] References Cited

U.S. PATENT DOCUMENTS

| | | | |
|---|---|---|---|
| 2,956,110 | 10/1960 | Shanahan | 358/124 |
| 3,801,732 | 4/1974 | Reeves | 358/124 |
| 3,919,462 | 11/1975 | Hartung et al. | 358/124 |
| 4,075,660 | 2/1978 | Horowitz | 358/124 |
| 4,081,832 | 3/1978 | Sherman | 358/124 |
| 4,091,417 | 5/1978 | Nieson | 358/124 |

Primary Examiner—S. C. Buczinski
Attorney, Agent, or Firm—H. Gordon Shields

[57] ABSTRACT

Apparatus is disclosed which modifies a video signal (in the video frequency range) for scrambling (encoding) and unscrambling (decoding) video signals for television pictures.

26 Claims, 16 Drawing Figures

TELEVISION SIGNAL MODIFICATION APPARATUS

This is a continuation, of application Ser. No. 911,399, filed June 1, 1978.

BACKGROUND OF THE INVENTION

1. Field of the Invention

This invention relates to television systems, and more particularly to scrambling and unscrambling (or encoding and decoding) video signals by selectively inverting these signals.

2. Description of the Prior Art

The prior art discloses primarily four techniques which are used to scramble video signals so that the reception of the signals results in an unintelligible picture on a television receiver screen. The first way that such scrambling may be accomplished is to change the frequency of the transmitter signal. A second way is to modulate the video portion of the signal with another video frequency electronic signal. A third method of scrambling video signals is to modify the real time position of the video. Finally, the fourth method is to modify the horizontal or vertical synchronization portions of the signal (sync signals) which will result in the receiver losing vertical or horizontal hold.

An example of the fourth method mentioned in the preceding paragraph is found in U.S. Pat. No. 3,813,482. The transmission of video signals is scrambled by repetitively depressing to a blanking level a plurality of sync signals, preferably the vertical sync signals, which produces a shifting and rolling picture.

Another means of varying the synchronizing information is disclosed in U.S. Pat. No. 3,801,732. This patent discloses the reversing of polarity of both the video and synchronizing information.

In U.S. Pat. No. 3,824,332, reference pulses of opposite polarity to the horizontal sync pulses are added to the composite television signal preceding each horizontal sync pulse. Video portions of the signal are inverted for randomly selected fields, after a code burst is added to the signal to indicate that the field immediately following the coding bursts is inverted.

Other examples of alternate scrambling and descrambling systems have been developed in the last several years in response to the possibility of producing pay or subscription television both by means of cable transmission and over-the-air transmission of signals.

One of the prime considerations in such scrambling and unscrambling systems is that the internal circuitry of a television set must not be altered by the unscrambling apparatus. That is, any unscrambling apparatus at a receiver must be independent from the internal workings of the television set itself, but must be able to be connected to the set in a manner that will accomplish the purposes of the pay or subscription television.

Of primary consideration in any pay or subscription television system which is added to an existing television set, such as a receiver in a home, or to a transmitter at a station, is the cost of the apparatus, in terms of not only manufacturing costs, but also in terms of installation costs and maintenance costs. Another consideration is with respect to the end product or picture which will be displayed on the receiving set resulting from the use of the apparatus. In other words, a factor to be considered is whether or not, or if so, to what extent a scrambling and unscrambling system will have an effect on the quality of the signals ultimately used to provide a picture on the picture tube. Obviously, a scrambling and descrambling system which is expensive to fabricate, difficult and therefore expensive to install, and difficult to maintain will have problems in terms of outright economic obstacles. The derogation of the signal resulting from the installation of such scrambling and unscrambling system is also of importance. No matter how acceptable in terms of monetary or economic considerations a scrambling and descrambling system may be, if the use of such system results in a poor quality picture, the entire system may be unfeasible.

Perhaps the most necessary ingredient to make subscription television a success is to have the ability to change scrambling codes easily. Individual codes for each television program is the best and most ideal situation. This would permit separate changes or billings for individual programs. The economic advantages of this type of system are obvious. Prior art apparatus is not readily adaptable to assign individual scrambling codes for a particular television program. The apparatus of the present invention has the advantage of being able to do so.

No new frequencies are required for the present apparatus. Accordingly, the system can be used with presently established broadcast stations.

In some of the prior art apparatus, it is difficult to change the scrambling codes once a system is installed in a set. However, in the present apparatus, scrambling codes may be easily changed. This inhibits possible selling of "black-market" decoders.

Briefly, there are some disadvantages of the prior art methods of scrambling and unscrambling as exemplified by the methods and apparatus discussed above, and particularly in some of the noted patents illustrative of the prior art as discussed above. The suppressing of synchronization (sync) pulses is rather expensive and there is a limited number of codes which can be employed under such circumstances. The shifting of real time is also rather expensive. A limited number of codes can be employed when a television signal is modulated with another video signal. If coding and decoding apparatus requires the changing of transmitter frequencies, there are immediate problems with the Federal Communications System (FCC). These economic (and other) problems are not found in the present invention because none of the factors are present. Instead, a relatively simple method is employed which is compatible with existing situations requiring no major changes or alterations.

The apparatus of the present invention comprises a scrambling and unscrambling (encoding and decoding) method and apparatus substantially different from the prior art as discussed above. The prior art apparatus and methods include the reconstituting or decoding of the scrambled signal prior to the television receiver antenna. This situation is expensive because of the required use of radio frequencies, and tuned circuits, all of which are expensive and relatively temperamental. The present apparatus does not reconstitute the television signal prior to the antenna, but merely prior to the television picture tube.

The present apparatus does not change the broadcast band or sync pulses, and no change is made in any existing composite TV signals, such as times, blanking pulses, or sync pulses. No new sync pulses or information pulses are added.

There are no tuned circuits in the present apparatus and no work is accomplished in the high frequency range. Moreover, the apparatus lends itself to the use of integrated circuits. A substantial economic advantage results. In addition, the prior art does not lend itself for inclusion into newly manufactured TV sets. The present decoding apparatus would result in a very minor design change and would be included in newly manufactured TV sets for a slight increase in the cost of the set.

As a separate unit, the apparatus included in the present system is relatively inexpensive to manufacture, to install, and to maintain, and the resulting picture is relatively unaffected. In some cases, a color picture may be enhanced by the use of the apparatus.

SUMMARY OF THE INVENTION

The apparatus disclosed herein comprises a manipulation of a video signal at a transmitter source so that the video signal received on a receiver screen is unintelligible unless the receiver is equipped with decoding apparatus. The scrambling is accomplished by modifying the video signal by selectively inverting the video signals 180 degrees as the signals are produced by a TV camera or recording equipment.

The color video signals are inverted 180 degrees prior to being transformed into the various matrix signals (I, Q, and Y signals, as discussed below), and prior to final modulation with the radio frequency carrier. This results in a negative image being transmitted either over the air or through a cable, as the case may be. When both a negative image (scrambled picture) and a positive image (normal picture) are sequentially superimposed on the TV tube, no picture results because the two different polarity pictures cancel each other out. An electronic counter is caused to increment according to horizontal sync timing pulses and is cleared by vertical timing pulses. This causes the counter to count horizontal sweeps relative to the last vertical synchronization (sync) signal. The counter in turn controls video inverters which invert the video signal at predetermined horizontal sweeps. This procedure makes possible numerous different codes available for TV programming. The decoding apparatus works exactly the same as the scrambling apparatus, only the video from the TV chassis is intercepted before the picture tube and inverted again 180 degrees back to positive image at predetermined horizontal sweeps.

Among the objects of the present invention are the following:

To provide new and useful television scrambling apparatus;

To provide new and useful television unscrambling apparatus;

To provide new and useful apparatus for inverting television video signals;

To provide new and useful apparatus for scrambling television signals in the video frequency range;

To provide new and useful apparatus for preventing color intensity changes which are inherent in scrambling systems which invert video signals;

To provide new and useful apparatus for providing a plurality of scrambling codes;

To provide new and useful apparatus for easily changing scrambling codes; and

To provide new and useful apparatus for inverting video information in a television system in response to predetermined horizontal sync signals.

BRIEF DESCRIPTION OF THE DRAWING

FIGS. 5a and 5b comprise schematic circuit diagrams of sweep detector apparatus incorporated into the present invention.

DESCRIPTION OF THE PREFERRED EMBODIMENT

Figure 1:
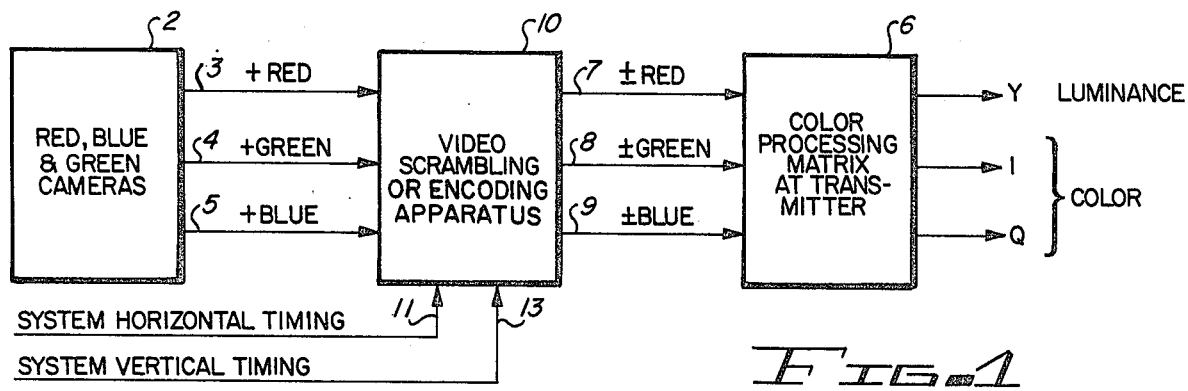
FIG. 1 is a block diagram illustrating the overall relationship of the scrambling apparatus of the present invention relating to a typical color television camera system and color processing matrix and transmission system.

FIG. 1 is a block diagram illustrating the overall relationship of the apparatus of the present invention with respect to a typical color television transmission system. A block 2 represents a color television (TV) camera, which includes three tubes which in turn provide three separate signals. One tube within the camera responds to red light, one to green light, and one to blue light. Light from a scene being televised is focused by the camera lens and is then divided and filtered by mirrors so that each tube in the camera receives light of only a single color. The output from the color camera accordingly comprises three video signals, one signal corresponding to the relative intensity of red light, one signal corresponding to the relative intensity of green light, and one signal corresponding to the relative intensity of blue light, for each portion of the view or picture being scanned by the scanning raster of the camera. A scene or picture is scanned by a television camera (and a corresponding scanning occurs in the receiver when the scene is received) by a total of 525 horizontal lines from the top of a screen to the bottom of a scene. That is, a composite scene or picture is made up of a raster of 525 lines, each line of which is individually scanned electronically by the television camera, and also by the television receiver synchronously with the television camera. The result is, to the eye of the viewer, a composite scene rather than individual lines. In black and white television, the camera records only variations of intensity of the scene or picture ranging from solid black to the absence of black, which is white. Between the white and the black are the various shades which make up a composite picture.

In color television, each portion of a scene or picture is a composite of the three color signals, red, green, and blue. In addition to the three color signals, a fourth signal representing the proper or appropriate pattern of light and dark, called the luminance signal, is also produced. In some situations, a fourth tube is used in the camera which receives an unfiltered image to permit the scanning raster to produce a signal which corresponds to the general pattern of light and dark of the scene or picture being scanned. In other cameras, a luminance signal is produced by proportionately combining the three color signals. Typically, the luminance signal is produced in the latter manner by combining the three color signals.

The output from the color camera comprises signals representing positive video image information for the color red, the color green, and the color blue. These signals are transmitted from the color camera to a color processing matrix. The red, green, and blue color video signals are changed by the matrix into the appropriate signals for transmission by the transmitter. The three color signals are processed by the matrix into two color signals referred to as I and Q signals, and another luminance signal which is referred to as the Y signal. The Y signal corresponds to the ordinary monochrome or black and white signal, while the I and Q color information signals are the chrominance signal, and can be compared to a pair of coordinates on a color wheel.

By use of both I and Q coordinate information, any point on a color wheel may be designated. Each point on the wheel represents, or corresponds to a particular color which varies from white at the center of the wheel outwardly from white to a pure color designated at the rim or outer circumference of the wheel. This is normally considered in terms of hue and saturation. The points on the rim of the wheel represent different hues, while the points inwardly from the rim toward the center represent varying mixtures of that hue with white in some degree of saturation. Using the coordinate information of the I and Q signals, any specific point on the wheel may be referred to. That particular point represents, then, a particular color in terms of hue and saturation.

The Y signal, or luminance signal, represents the variations of light and dark, and, as indicated, corresponds to the black and white signal received and displayed by a black and white television set.

In the apparatus of the present invention, as illustrated in FIG. 1, three signals, representing the red, the green, and the blue color information, are transmitted from the camera 2 to video scrambling apparatus 10 of the present invention by three conductors 3, 4, and 5, respectively. The video scrambling apparatus 10 of the present invention in turn inverts the positive image information received from the camera on the conductors 3, 4 and 5, and transmits the inverted or negative image red, green, and blue video information on three conductors 7, 8, and 9, to the color processing matrix 6. In turn, the color processing matrix 6 transmits its output signals for appropriate modulation, and ultimately, transmission. In the matrix, the I and Q chrominance signals are appropriately modulated together and transmitted to an adder, which receives the luminance signal directly, and the adder in turn sends an "S" signal which is the composite representation of the three signals, the Y signal, the I signal, and the Q signal, to a transmitter for transmission.

It may be seen from FIG. 1 that the video scrambling apparatus 10 of the present invention simply intercepts the video information from the camera to the color processing matrix. After the information from the camera is appropriately scrambled, the scrambled or negative image information is then transmitted for processing by the matrix.

Additional input to the video scrambling apparatus 10 is received by a pair of conductors 11 and 13. Conductor 11 transmits horizontal timing information in the form of timing pulses, while conductor 13 transmits vertical timing information also in the form of timing pulses to the scrambling apparatus. The timing pulses provide for the synchronizing and incrementing of the counter, as will be discussed below.

The video scrambling apparatus of the present invention accordingly is simply interposed between the camera and the color processing matrix. The positive image video signals (red, green, and blue) are received by the video scrambling apparatus 10. The signal level of the three video signals, for certain horizontal lines, is appropriately inverted, in accordance with a predetermined or preselected code. The inverted negative image video signals for the inverted lines, plus the positive image video information for the lines not inverted, are then sequentially transmitted to the matrix for appropriate processing into the I, Q, and Y signals. In addition to the three color signals from the camera, only timing information comprising the horizontal and vertical timing pulses is needed by the scrambling apparatus 10. Because the luminance signal is derived from the color signals from the camera, inverting the color signals will also result in the luminance signal being inverted for black and white TV which results in a scrambled black and white TV picture. No special apparatus is required for scrambling black and white pictures. At the receiver, the decoding apparatus would be substantially the same. Only one video inverter would be necessary, instead of three, for decoding or unscrambling the black and white picture.

Figure 2:
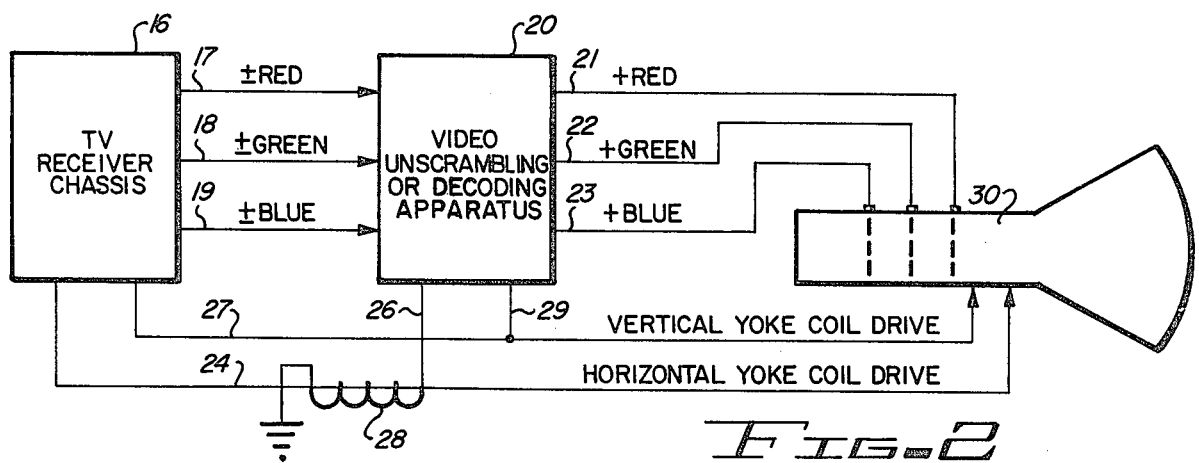
FIG. 2 is a block diagram illustrating the relationship of the decoding apparatus of the present invention to a TV receiver chassis and a picture tube of the chassis.

FIG. 2 is a block diagram illustrating the relationship of the video unscrambling or decoding apparatus of the present invention to a television receiver chassis and to the picture tube associated with the chassis. The scrambled or encoded video information signals are received by the television receiver and the information is processed as received, either in its scrambled or inverted form, or in its positive or not inverted form. The color video information thus processed is intercepted by the decoding apparatus prior to the picture tube.

A television receiver without the unscrambling apparatus of the present invention receives the information and processes it in its received, scrambled condition, which is the way the information is transmitted by the television transmitter. Appropriate amplification and demodulation of the received signal is accordingly again processed back into the Y or luminance and the I and Q or chrominance signals. The I and Q chrominance signals are further processed back to the relative intensities of red, green and blue video information for transmission to the picture tube. However, line by line, the color information, that is, the red, green, and blue video signals, is still in the inverted and not inverted sequence as scrambled or encoded by the scrambling apparatus 10 (see FIG. 1). The scrambled video, in this arrangement, results in an unintelligible picture on the TV screen because the positive and negative image horizontal line cancel each other out when they are viewed as a complete scene.

The present invention employing the decoding or unscrambling apparatus 20 intercepts the video information between the receiver chassis 16 and the picture tube 30.

The processed but inverted, and some not inverted, video information is transmitted from the TV receiver chassis on conductors 17, 18, and 19, which respectively transmit red, green, and blue video information. In a normal color TV receiver, the information is transmitted from the chassis directly to the picture tube. However, the apparatus of the present invention contemplates the interception of the video information by video decoding apparatus 20. The color video signals are decoded or appropriately reinverted by the decoding apparatus and the correct video information is then transmitted to a picture tube 30 from the video decoding apparatus.

Referring again to FIG. 1, the video information from the camera 2 is transmitted line-by-line to the video scrambling or encoding apparatus 10. The information is transmitted on the conductors 3, 4, and 5, which respectively transmit red, green, and blue video information in what may be referred to as a positive image format. That is, the information for the three color signals is "positive" in that the information corresponds to the scene being photographed by the camera.

Within the video scrambling apparatus 10, some, but not all, of the information is scrambled or encoded by inverting the color information, as will be described in detail below. On a line-by-line basis, not all of the information is inverted, but rather only information for preselected or predetermined horizontal lines is inverted. For example, every fifth line may be inverted to scramble a total picture. In other words, the video information for one or more predetermined or preselected horizontal lines may be inverted to produce a scrambled or encoded picture. The determination of which lines to invert is made by the particular code employed. For practical design considerations, a series of sixteen horizontal lines are repetitively counted in the present apparatus for coding and decoding purposes, as discussed in detail below.

The color video information from the camera 2 to the scrambling apparatus 10 comprises a signal which includes two components, a dc voltage level and picture information which modulates the dc voltage level. In scrambling the video information, the video scrambling apparatus 10 simply inverts the picture information which is used to modulate the dc reference voltage. The quantity of the signal is not changed. Only the direction of the signal from the dc reference level is changed by the scrambling apparatus.

The video information on conductors 7, 8 and 9 from the video scrambling apparatus to the matrix 6 includes both positive information, which is the video information which is not inverted, and the negative information, which is the inverted video information as inverted by the scrambling apparatus 10.

The horizontal timing pulses and the vertical timing pulses for the television system are transmitted to the scrambling apparatus 10 by conductors 11 and 13, respectively. This is for purposes of incrementing and synchronizing the counter and other control activities in the encoding apparatus, as will be discussed below.

The information in the signals transmitted from the receiver chassis 16 (see FIG. 2) to the decoding apparatus 20 on conductors 17, 18, and 19 includes both positive video information and negative video information. The positive information is, of course, the information from the lines of the scanned raster which are not inverted by the scrambling apparatus, and the negative information is that which was processed by the inversion of the video information, as discussed above. The video information, as decoded by the unscrambling or decoding apparatus 20, is in turn transmitted to the picture tube 30 as positive image video for all horizontal lines. The red, green, and blue video information is transmitted respectively on conductors 21, 22, and 23, which extend from the video apparatus 20 to the picture tube 30.

The horizontal and vertical sweep currents are transmitted from the receiver chassis to the horizontal and vertical yoke coils on the picture tube by conductors 24 and 27, respectively. Sweep currents are coupled to the decoding apparatus 20 from the conductors 24 and 27 by conductors 26 and 29, respectively. Conductor 26 extends from the video decoding apparatus 20 to inductor 28 which is disposed about the conductor 24. Conductor 29 extends from the decoding apparatus 20 to conductor 27. The respective horizontal and vertical signals to the decoding apparatus 20 are used for various electrical functions internal to the decoding process, including the incrementing and synchronizing of a counter, and the controlling of other functions, as will be discussed in detail below.

Figure 3A:
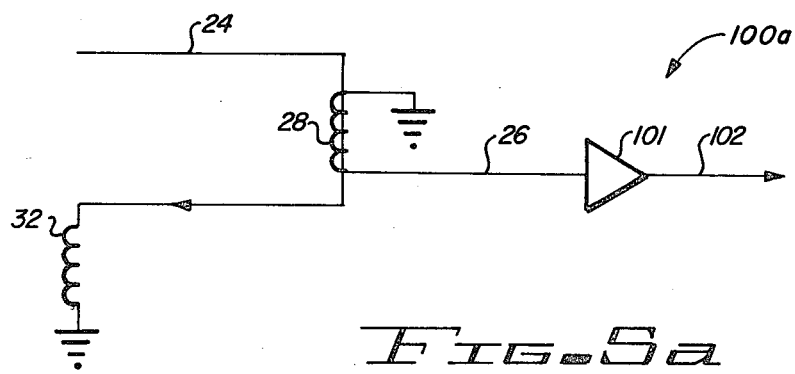
FIG. 3 is a schematic block diagram representing the video scrambling (encoding) apparatus of the present invention.
Figure 3B:
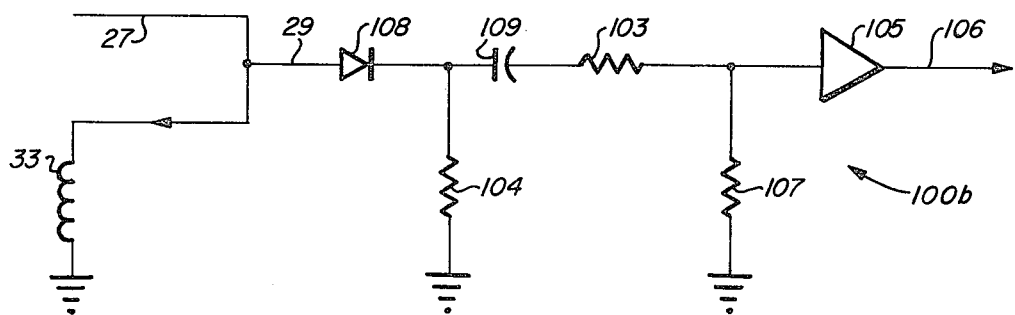
Figure 3:
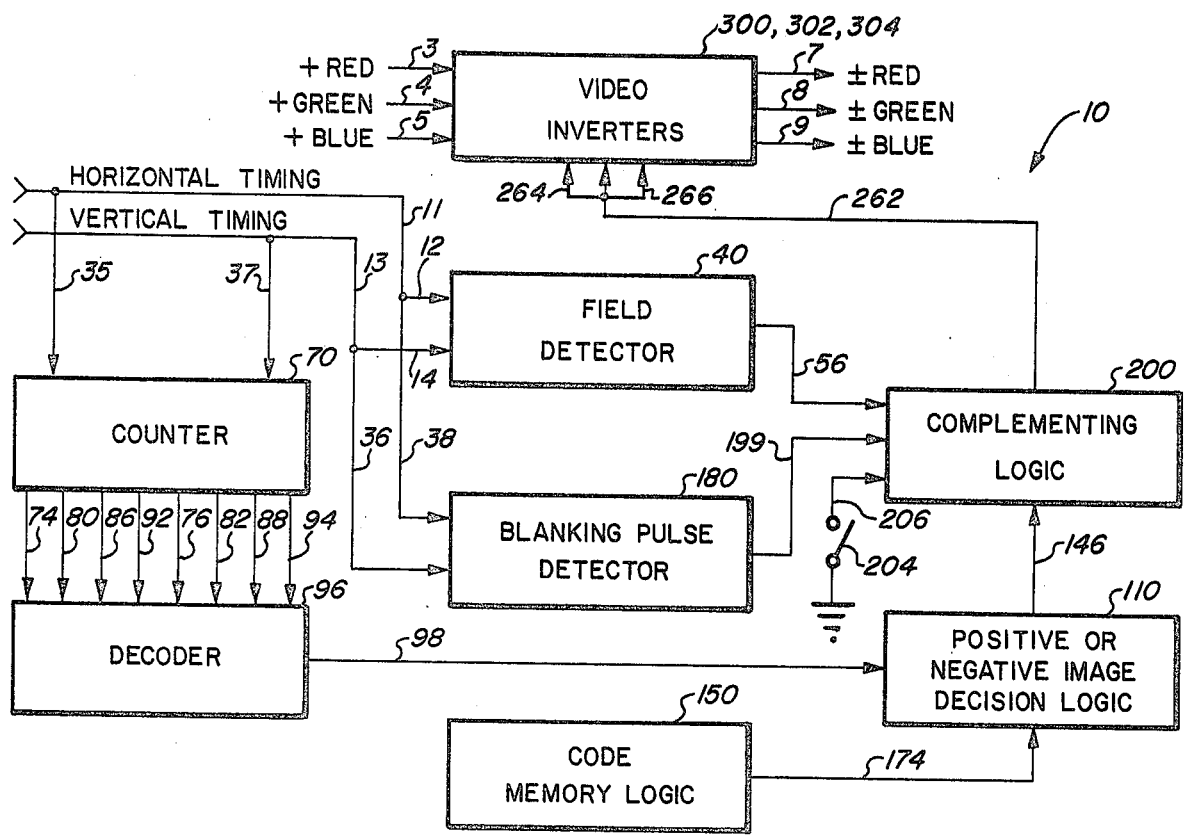

FIG. 3 is a schematic block diagram of eight blocks or components representing the video scrambling apparatus 10 of the present invention. The scrambling apparatus is shown as a single block in FIG. 1. The function of the scrambling apparatus 10 is to scramble or encode the TV video scenes so as to prevent television receivers not equipped with the video unscrambling apparatus 20 of FIGS. 2 and 4 from receiving an intelligible picture. Each of the eight blocks are explained in detail below in conjunction with the appropriate figures of the drawing. However, a brief overall description of the eight blocks working together as a system will be made with reference to FIG. 3.

A single TV picture or "frame" of 525 lines is made up of two "fields", each of 262.5 lines. The fields are referred to as odd and even fields, with the nomenclature referring to the numbering of lines in each field, whether even or odd. For example, the first field of odd lines comprises odd lines 1, 3, 5, 7 . . . 525, while the second or even field comprises even lines 2, 4, 6, 8 . . . 524. The two fields are interlaced to comprise a single frame or picture to prevent the appearance of flicker on the screen which would otherwise result.

In the first field of odd lines, line 1 is scanned from one side of the screen (TV picture tube) to the other, and the scanning line is rapidly returned to the opposite side to scan the second line in the field, which is line 3 of the frame. The process continues until the entire field of 262.5 odd lines has been scanned. The second field of even lines is then scanned, again beginning at the top of the screen and moving across, returning, and moving downwardly between the lines of the first or odd field. The scanning or interlacing of the two fields is quite rapid. Thirty complete frames, or sixty fields are scanned each second.

The scrambling, sometimes referred to herein as encoding, is accomplished by inverting the color video signals for selected horizontal lines for transmission by the TV system transmitter. Some horizontal lines will be broadcast in the non-inverted or positive image format, and some horizontal lines will be broadcast in the inverted, or encoded, negative image format. This of course results in a scrambled or unintelligible picture on a TV screen not equipped with the unscrambling apparatus 20 of FIGS. 2 and 4.

Different lines may be selected for inversion for each TV program, thereby giving the ability to charge specified amounts for each subscription program. Lines selected for inversion are recognized or selected by means of a punched, non-conductive disk, such as paper, discussed in detail below in conjunction with FIG. 8, which is placed into a code memory logic 150, shown as part of the system in FIGS. 3 and 4. The punched paper disk constitutes a ticket for which charges may be made in the environment of the unscrambling apparatus 20 of FIGS. 2 and 4. The disk may have the information for more than one subscription program punched into it, as desiired. The scrambling or encoding information for each program is placed on a punched disk at the scrambling apparatus 10 of FIGS. 1 and 3 for scrambling. The same information is placed on a punched "ticket" disk for unscrambling the picture at the apparatus 20 of FIGS. 2 and 4. The unscrambler 20, of course, restores the encoded or inverted horizontal lines back to their non-inverted or normal polarity for proper display on the TV screen.

In both the scrambling apparatus 10 and the unscrambling apparatus 20, the same components or elements are needed, and such common elements include the same reference numerals. However, when different elements are used, different reference numerals are used. For example, timing information, discussed below in detail in conjunction with FIG. 5, is acquired differently in the scrambling apparatus from the way it is acquired in the unscrambling apparatus. The reference numerals for the various conductors associated with timing information are therefore different in the Figures of the scrambling and unscrambling apparatus.

The horizontal and vertical timing signals or pulses from the television transmitter system are coupled to the video scrambling apparatus on conductors 11 and 13, respectively. Horizontal timing pulses are transmitted to the counter 70 on conductor 35 which is connected to the conductor 11. The field detector 40 and the blanking pulse detector 180 receives horizontal timing pulses respectively on conductors 12 and 38. The conductors 12 and 38 are connected to the apparatus input conductor 11. Vertical timing pulses are transmitted to the counter 70, field detector 40, and blanking pulse detector 180 on the respective conductors 37, 14, and 36. The conductors 37, 14, and 36 are all connected to the vertical timing input conductor 13.

In order to keep track of the specified lines selected for inversion or encoding, a counter 70 is caused to count the horizontal lines. Counting the horizontal lines is accomplished for the purpose of interrogating the code memory logic 150 to establish whether a particular horizontal line is to be inverted for transmission. The counter 70 is synchronized to the television transmitter system vertical timing. When a vertical timing pulse is sent to the counter it is set directly to a full count. Subsequently the counter is incremented by the television transmitter system horizontal timing. This results in the counter counting horizontal lines relative to the previous vertical timing pulse. In effect the counter is synchronized to the vertical timing of the transmitter system.

The counter counts horizontal lines from one to sixteen. The seventeenth horizontal pulse results in the counter going back to the count of one from that count of sixteen. In this way, a field of lines, 262.5 in all, is counted one through sixteen over and over again sixteen times ($256 \geq 16 = 16$) per field. A field is therefore divided into sixteen groups of sixteen lines each. The relative count of each line, one through sixteen, in each group serves as the basis for identifying lines for inversion to satisfy a particular code selected for scrambling a program. For example, lines 3, 4, 6, 7, 8 and 11 may be selected for inversion while lines 1, 2, 5, 9, 10, 12, 13, 14, 15, and 16 are transmitted in the normal or non-inverted state. Using a one through sixteen counter, 65,536 combinations are available for purposes of scrambling various TV programs. Since the counter sequentially counts lines in each field, lines in opposite fields with corresponding numbers (in corresponding groups of numbers) are adjacent to each other in an interlaced frame.

The counter 70 counts in binary form and is well known in the art. It is synchronized or set directly by the television system vertical timing coming into the apparatus on conductor 13. A conductor 37 extends from the conductor 13 to the counter 70.

A decoder 96 decodes the particular count present in the counter at any given time. Inputs to the decoder 96 are the binary counts 1, 2, 4 and 8 on conductors 74, 80, 86 and 92, respectively, and the counts 1(not), 2(not), 4(not), and 8(not) on the conductors 76, 82, 88, and 94, respectively. The decoder 96 is also a well known element in the art.

The output of the decoder 96 consists of sixteen individual conductors, one for each line or count one through sixteen, represented by a single conductor 98 in FIG. 3. The decoder 96 decodes the particular count of the counter 70 and appropriately signals a high level signal on one of the sixteen conductors 98 to the positive or negative image decision logic 110.

Which conductor, one through sixteen, identified collectively by reference numeral 98, has the high level signal depends on the particular state of the counter. If the counter is at a count of three, then the third conductor will have the high level signal. The high level signal for the count of three constitutes a qualifying input to a NAND gate in positive or negative image decision logic 110. Sixteen NAND-gates in the image logic 110 are paired on a one-for-one basis with the sixteen decoder output conductors represented by the conductor 98 from the decoder 96. A corresponding qualifying input to each NAND-gate of the image logic 110 comes from the code memory logic 150.

Sixteen conductors, represented by a single conductor 174, constitute the encoding or scrambling information from the code memory logic 150 to the positive or negative image decision logic 110. If the signal level of the particular conductor representing the third line out of the sixteen conductors represented by conductor 174 also has a high level signal as in the example above, then the NAND-gate for the third horizontal line will be qualified. The result of this qualified NAND-gate for line three is a low level signal on conductor 146 to complementing logic 200. The low level signal present on conductor 146 signals three video inverters 300, 302, and 304, one inverter for each color, by way of the complementing logic 200, to appropriately process the video for line three as specified by the punched paper disk in the code memory logic 150.

Like the above example for horizontal line three, the scrambling information stored in the code memory logic 150 for each of the sixteen lines sequentially identified by the counter determines if a particular line is to be transmitted in the inverted or non-inverted state.

The output from the positive or negative image decision logic 110 is transmitted on conductor 146 to the complementing logic 200. At this point, the single conductor 146 is a composite of the sixteen horizontal lines on an individual basis. Conductor 146 serves as a "wire" OR-gate to OR the sixteen NANDed signals from the code memory logic 150 and the decoder 96. The signal level on the conductor 146 is either high or low, depending on the code employed by the particular horizontal line identified by the counter. The complementing logic 200 will be discussed in detail below in conjunction with FIG. 12.

Other inputs to the complementing logic 200 include a signal from a key-switch 204 on conductor 206, and a signal from a field detector 40 and a blanking pulse detector 180 on respective conductors 56 and 199.

The purpose of the key-switch 204 is to insure that the scrambling apparatus 10 works only in the positive or non-inverted video image mode for non-subscription TV programs. That is, if programs are transmitted without being encoded, the switch 204 is closed, thus providing a low or grounding signal to the complementing logic 200. As discussed in detail in conjunction with FIG. 12, this low signal results in the transmission of only positive image or non-inverted, non-encoded video information for all horizontal lines.

Timing information is transmitted to the field detector 40 on conductors 12 and 14. The purpose of the field detector, as its name implies, is to detect which field, odd or even, is being scanned. The output from the field detector 40 is transmitted by the conductor 56 to the complementing logic 200.

On command from the field detector 40, the complementing logic 200 causes the inversion of video information during odd fields just the opposite of what the positive or negative images logic 110 commands. This means the video inverting commands present on conductor 146 for each horizontal line are themselves inverted 180 degrees during odd fields on command from the field detector 40. The output of the complementing logic 200 on conductor 262 is therefore the same signal as on conductor 146, but modified or inverted, and not modified or not inverted, according to the presence of an odd or even field, respectively.

The reason for the inversion of command signals on conductor 146 according to the presence of an odd or even field is to eliminate possible color distortion which is brought out by inverting TV signals for transmission and then re-inverting them back to their normal positive state at the TV receiver. This is discussed in detail in conjunction with FIGS. 11 and 12.

The inputs to the field detector 40 consist of transmitting horizontal and vertical timing signals at the respective input conductors 12 and 14. The conductor 12 connects to the horizontal conductor 11 and the conductor 14 connects to the vertical timing conductor 13 of FIG. 3.

Timing information is also required for the blanking pulse detector 180. The information is transmitted to the blanking pulse detector on conductors 36 and 38, which extend respectively from the conductors 13 and 11 to provide vertical and horizontal timing information. The output from the blanking pulse detector 180 is transmitted to the complementing logic 200 by a conductor 199. As its name implies, the purpose of the blanking pulse detector 180 is to detect the blanking pulses. The output of the detector 180 on conductor 199 causes the apparatus of the present invention to transmit the blanking and sync pulses always in their positive or non-inverted form. This is accomplished through the complementing logic 200, as explained in detail below.

The output of the blanking pulse detector 180 is paired with the key switch 204 to provide inputs to the complementing logic 200. As discussed above, these signals prevent the scrambling apparatus 10 from inverting video information. Therefore, the blanking and sync pulses are always transmitted in the non-inverted form. The reason this is necessary is because television receivers cannot process inverted blanking pulses and sync pulses due to voltage pickoff levels fixed in the receiver.

To prevent the receivers from becoming unsynchronized and from interfering with proper blanking of the CRT during the fly-back time, the blanking pulse detector 180 causes the apparatus to operate in the non-subscription mode during the presence of blanking and sync pulses. Only the picture information is scrambled or inverted on a line-by-line basis for purposes of subscription programming.

Inputs to the blanking pulse detector 180 consist of television system horizontal and vertical timing signals on the respective conductors 38 and 36. The conductor 38 is connected to the horizontal timing conductor 11 and the conductor 36 is connected to the vertical timing conductor 13.

The output of the complementing logic 200 is transmitted by a conductor 262 to the video inverters 300, 302, and 304. The video inverters comprise the apparatus which inverts, or which does not invert, the video information. It will be noted that three conductors 3, 4, and 5, representing each respectively the red, green, and blue video information from the TV camera, comprise inputs to the video inverters, along with conductors 262, 264 and 266. As will be discussed in detail in conjunction with FIG. 13, three video inverters are required for the apparatus of the present invention, or one video inverter for each color. For convenience, a single block in FIG. 3 represents the three video inverters 300, 302, and 304, shown in FIG. 13.

In FIG. 3, a single block is conveniently illustrated with three inputs from the complementing logic and with three separate inputs from a TV camera, one input for each color. Similarly, three outputs 7, 8, and 9 are shown extending from the video inverters. The conductors 7, 8, and 9 extend to a television transmitter matrix for further signal processing. The outputs 7, 8, and 9 are inverted or not inverted, in accordance with the predetermined code from the code memory logic 150. The inverting signal on conductors 262, 264, and 266 instructs the three video inverters to invert the video information for all three colors alike at the same time.

Each of the eight blocks illustrated in FIG. 3 is discussed in detail below in conjunction with the schematic diagrams for the various blocks.

The field detector 40 is illustrated in FIG. 3 as an integral part of the apparatus of the present invention, and will be discussed in detail below in conjunction with FIG. 11. However, field detector apparatus, while necessary in the television unscrambling apparatus 20 at the receiver, may not be required in the television scrambling apparatus at the transmitter, providing that it is possible to tap directly into the transmitter circuitry to identify odd or even fields for use by the complementing logic 200. However, if the television camera or transmitter apparatus is not able to be tapped into directly to identify the odd or even fields, such field detector apparatus as illustrated in FIG. 3 and in detail in FIG. 11 will be necessary.

With respect to the blanking pulse detector apparatus 180, such apparatus may not be required in the environment of a television transmitter as shown in FIGS. 1 and 3, depending on whether blanking and sync signals are so superimposed by the camera, then the blanking pulse detector 180 will be required, as shown, prior to the television matrix. However, if the blanking and sync pulses are superimposed on the video in the matrix, after the scrambler and camera, then the blanking pulse detector is unnecessary in the scrambling apparatus 10. However, in sucn case its presence as shown in FIG. 3 will not affect the overall system.

Referring to the horizontal and vertical input timing signals on the conductors 11 and 13 of FIG. 3, reference is made to "timing" pulses as opposed to "blanking" or "sync" pulses. Timing pulses are defined as any pulses which occur at the specified frequency of the system horizontal and vertical timing. Accordingly, the horizontal timing pulses come directly off the horizontal oscillator so as not to include equalization pulses occurring during the vertical sync period. Equalization pulses would confuse the field detector 40 if they were supplied to conductor 11.

It will be noted also that the terms "timing signals" or "timing information" may be any suitable additional signal added to the composite television signal and generated specifically for use with the apparatus of the present invention. Such additional timing signal may be used to increment and set the counter for purposes of encoding and decoding the video information in the television signal on the basis of a predetermined code in conjunction with the counter. However, for ease of adapting the present invention to existing television receivers, horizontal and vertical timing signals are used to increment and set the counter in the apparatus as illustrated herein.

Figure 4:
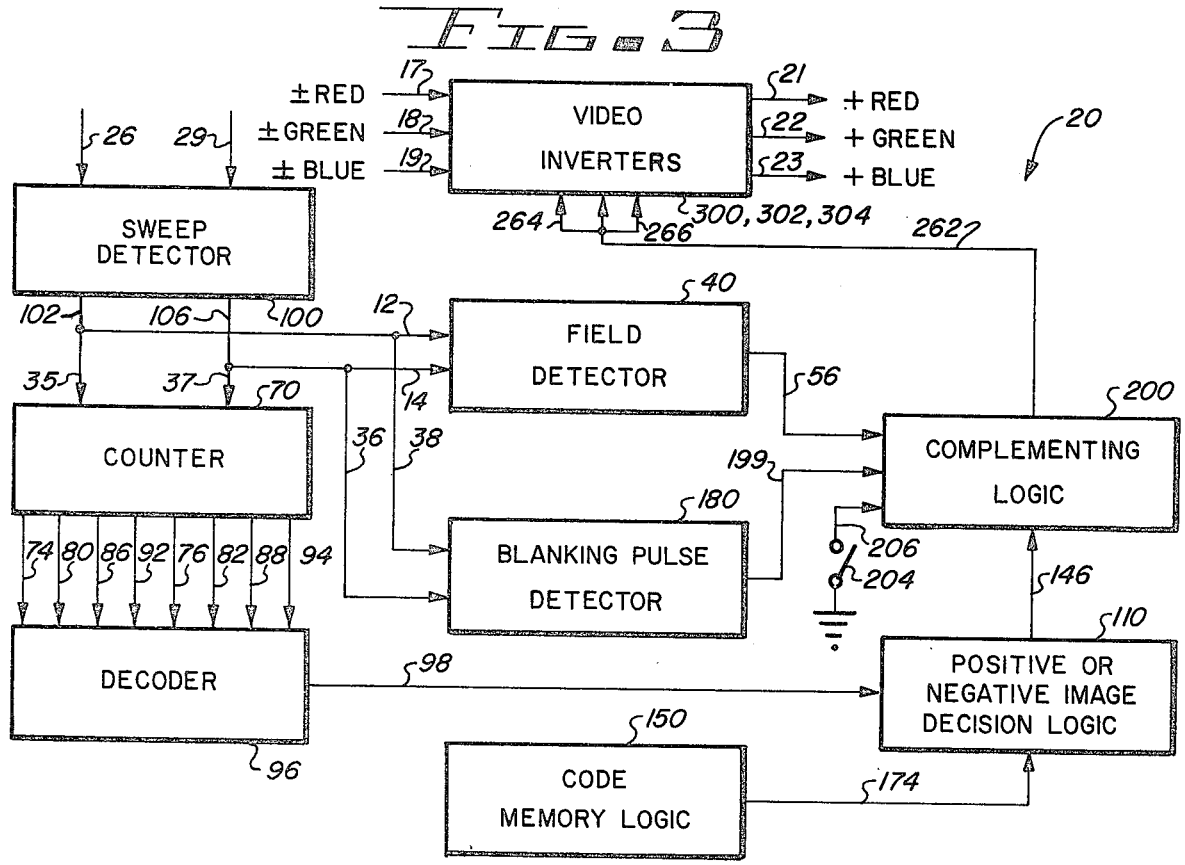
FIG. 4 is a schematic block diagram representing the video unscrambling (decoding) apparatus of the present invention.

FIG. 4 is a block diagram representation of the video unscrambling apparatus 20 which is shown as a single block in the environment of a television receiver chassis and a picture tube in FIG. 2. The purpose of the unscrambling apparatus 20 is to intercept the color video signals at a point between the receiver chassis and the picture tube for purposes of re-inverting or unscrambling selected horizontal lines which were scrambled or encoded by inversion at the transmitter. TV receivers not equipped with the apparatus 20 will not be able to unscramble the picture information.

FIG. 4 includes nine blocks, rather than the eight blocks shown in FIG. 3. The primary difference between the apparatus of FIG. 3 and the apparatus of FIG. 4 is that the apparatus of FIG. 4 includes a vertical and horizontal sweep detector 100, which detector is not required for the encoding apparatus 10. At the transmitter it is possible to tap directly into circuitry for purposes of providing the necessary horizontal and vertical timing to the apparatus 10. However, at the receiver, a direct pickup of the timing signals from the receiver chassis is not acceptable.

The sweep detector 100 generates horizontal and vertical timing pulses by detecting the fast changing fly-back currents present in the conductors driving the yoke coils at the picture tube. This eliminates the undesirable approach of taking the timing pulses from points internal to the television receiver chassis.

If the apparatus 20 of the present invention is built directly into a television set, such as a newly manufactured set, such sweep detector apparatus 100 may not be required if the timing information is provided directly from vertical and horizontal oscillators in the system. Again, as discussed above in conjunction with FIGS. 3, only the basic horizontal timing frequency is to be supplied to the apparatus 20. The equalization pulses present in the horizontal timing during vertical synchronization will confuse the field detector apparatus 40 included in the apparatus 20 of FIG. 4. In newly manufactured TV sets, a horizontal timing signal should be selected which does not include the equalization pulses.

How the sweep detector 100 generates the proper horizontal and vertical timing pulses for the apparatus 20 will be discussed in detail in conjunction with FIG. 5. Referring to FIG. 4, the conductors 26 and 29 provide the necessary sweep currents and voltages associated with the drive conductors for the respective horizontal and vertical yoke coils at the picture tube. The sweep detector detects rapid changes in the yoke signals during the fly-back periods and generates from such changes appropriate horizontal and vertical timing signals for the apparatus 20. The output conductors 102 and 106 from the sweep detector serve essentially the same purpose as the respective horizontal and vertical timing conductors 11 and 13 of the scrambling apparatus 10 of FIG. 3. Everything else in the unscrambling apparatus 20 is essentially the same as in the video scrambling apparatus 10.

The other elements of FIG. 4, including the counter 70, the decoder 96, the field detector 40, the blanking pulse detector 180, the code memory logic 150, the positive or negative image decision logic 110, the key switch 204, the complementing logic 200, and the video inverters 300, 302, and 304, with their appropriate conductors extending between the respective elements, are substantially identical to those shown in FIG. 3, including the same reference numerals for the blocks and for the conductors.

The elements operate substantially the same in video scrambling or encoding apparatus as they do in the video unscrambling or decoding apparatus. The discussion in conjunction with FIG. 3, above, which describes the relationship of the blocks working together as a system for scrambling video, also applies to the unscrambling apparatus 20 for purposes of unscrambling the transmitted picture at the receiver. Thus in the detailed discussion below for FIGS. 5–13, discussing each of the elements or blocks illustrated in both FIGS. 3 and 4, either the scrambling or unscrambling mode may be discussed. If there is a difference between the scrambling or unscrambling apparatus, such difference will be set forth within the context of the discussion for each element.

With respect to the video inverter 300, it will be discussed in detail in conjunction with FIG. 13. However, as in FIG. 3, a single block is shown representing the three video inverters 300, 302, and 304. The inputs to the video inverters of FIG. 4 are the red, green, and blue video signals coming frm the television chassis. Some horizontal lines at this point are inverted or scrambled according to the particular code employed. The output conductors 21, 22, and 23, of the video inverters 300, 302 and 304, have the respective red, green and blue signals inverted back to the normal positive state for proper display on the TV picture tube. The proper unscrambling of the inverted horizontal lines occurs only if the code memory logic 150 employs a punched non-conductive disc handling the same scrambling code as used at the transmitter scrambling apparatus 10.

FIGS. 5a and 5b are schematic diagrams of sweep detector apparatus for generating horizontal and vertical timing pulses. The purpose of the sweep detector 100 of FIG. 4 is to develop horizontal and vertical timing pulses necessary to operate the unscrambling or decoding apparatus 20. FIGS. 5a and 5b are schematic diagrams of two different sweep detector circuits shown jointly as a block in FIG. 4. The sweep detectors illustrated comprise an inductive sweep detector circuit in FIG. 5a, and a capacitive sweep detector circuit in FIG. 5b. Each has unique advantages in certain applications as will be discussed below.

The apparatus of the present invention requires the use of vertical and horizontal timing pulses for the counter, the blanking pulse detector, and the field detector, all of which are discussed in detail below in conjunction with FIGS. 6, 10, and 11. In television receiver sets in which the apparatus of the present invention is incorporated in manufacturing, the horizontal and vertical oscillators may be tapped directly for their respective timing pulses, thus eliminating the necessity for the sweep detector apparatus illustrated in FIGS. 5a and 5b.

Both sweep detectors in FIGS. 5a and 5b generate timing pulses by sensing the decrease in current in the yoke coil drive conductors during the fly-back time of the raster. The fly-back time for the horizontal raster is quite rapid as compared with the fly-back time for the vertical raster. Accordingly, the decrease in yoke current during fly-back time is relatively slow for the vertical sweep and relatively rapid for the horizontal sweep. The relationship between the fly-back time and the decrease in current tends to make an inductive sweep detector more suitable for generating the horizontal timing pulses and a capacitive sweep detector more suitable for generating the vertical timing pulses. This is because larger and more stable voltages are induced in a coil where the current change is rapid, as in the horizontal sweep circuit. On the other hand, a capacitive detector is easier to design for the relatively slowly changing fly-back current of the vertical sweep circuit. Actually, either of the two sweep detector circuits of FIGS. 5a and 5b may be used for generating both vertical and horizontal timing pulses, provided proper stability can be achieved. However, as indicated above, inductive sensing may be preferable for horizontal and capacitive sensing for vertical applications.

FIG. 5a is a schematic circuit diagram for the inductive generation of horizontal timing pulses. Conductor 24 comprises a portion of the horizontal yoke coil drive, and an inductor 28 is disposed about the horizontal conductor 24. Arrows on the conductor 24 indicate the movement of the signal in the conductor from the TV chassis to the picture tube. The purpose of the arrows is merely to indicate the movement of a signal transmission and is not to indicate a particular polarity with respect to the direction of current flow in the conductor. A coil 32 represents the horizontal yoke coil, one end of which is grounded for illustrative purposes. The ground in an actual TV receiver is usually replaced by circuitry associated with horizontal centering. A conductor 26 extends from the inductor 28 to an amplifier or buffer driver 101. An output conductor 102 in turn extends from the amplifier 101.

The amplifier 101 receives an input signal from the inductor 28 in response to the decreasing horizontal fly-back current through the horizontal drive conductor 24. The fly-back current in the conductor 24 induces a voltage in the inductor 28 which is transmitted to the amplifier 101 by the conductor 26. The voltage from the inductor 28 is amplified by the buffer amplifier 101 and is subsequently transmitted as horizontal timing pulses to other sections of the apparatus, as required, on conductor 102.

The buffer amplifier 101 is of the high gain, high input impedance type. It therefore may be necessary to shield the input conductor 26 to prevent it from acting as an antenna by picking up undesired signals. Also, the output stage of the amplifier 101 is designed to give a ground going output pulse on conductor 102 in response to the sensing of the horizontal fly-back current. The static voltage at the output on conductor 102 will be of a positive level appropriate to operate the circuitry in the rest of the apparatus.

FIG. 5b comprises a schematic diagram for the capacitive generation of vertical timing pulses. Conductor 27 in FIG. 5b comprises a portion of the vertical yoke drive in the TV receiver. A coil 33 represents the vertical yoke coil, one end of which is grounded for illustrative purposes. In actual application, the grounded end of coil 33 usually is connected to the vertical centering circuitry. A conductor 29 extends from conductor 27 to the anode of a diode 108. The other end of the diode (the cathode) is connected to a capacitor 109. The diode 108 prevents possible resonance from developing between the sweep detector circuit and the vertical yoke coil.

A resistor 104 extends to ground between the diode 108 and the capacitor 109. The negative end of the capacitor 109 is connected to a resistor 103 which is in turn connected to the input of the buffer amplifier 105 and to a grounded resistor 107. The resistor 104 provides a discharge path for the capacitor 109 during vertical fly-back time. The resistors 103 and 107 function as a voltage divider to effectively reduce the amplitude of the voltage (from the discharge of capacitor 109) to the input of the amplifier 105. At the same time, the resistors 103 and 107 provide a charge path for the capacitor 109.

The capacitor 109 discharges during the fly-back of the vertical raster thus generating a vertical timing pulse. The voltage divider network, resistors 103 and 107, prevents the amplifier 105 from seeing the total amplitude of the capacitor when it discharges. The discharge of the capacitor is followed by a relatively slow charging time between the vertical sync pulses.

The discharge of the capacitor provides a negative going pulse to the input of amplifier 105, and the negative pulse is amplified and imposed on a positive DC static voltage at the amplifier output on conductor 106, thus providing a vertical timing pulse or signal. The appropriate vertical timing signal is in turn transmitted on conductor 106 to other sections of the apparatus.

The design of the capacitive sensing network must be such that the time constant of resistors 103, 107 and 104 will permit the full discharge of the capacitor during the vertical fly-back time. In other words, the capacitor 109 must be capable of discharging faster than the decrease in the fly-back voltage of the sweep. Also, the input impedance of the amplifier 105, together with the impedance of the above described RC network, must be high enough in value so as not to interfere with the normal operation of the television's vertical sweep network.

All of the above is well known and understood in the art. Moreover, it is understood that diode 108 and the circuitry shown is designed to be compatible with television sets whose vertical sweep voltage is positive relative to ground. Appropriate changes may be made in the diode, voltage divider network, and amplifier, for sweep voltages which are negative relative to ground.

In summary, the sweep detectors of FIGS. 5a and 5b generate the required horizontal and vertical timing pulses on the respective output conductors 102 and 106 for distribution to the counter 70, field detector 40, and blanking pulse detector 180 of the video unscrambling or decoding apparatus 20, as shown in FIG. 4.

Figure 6:
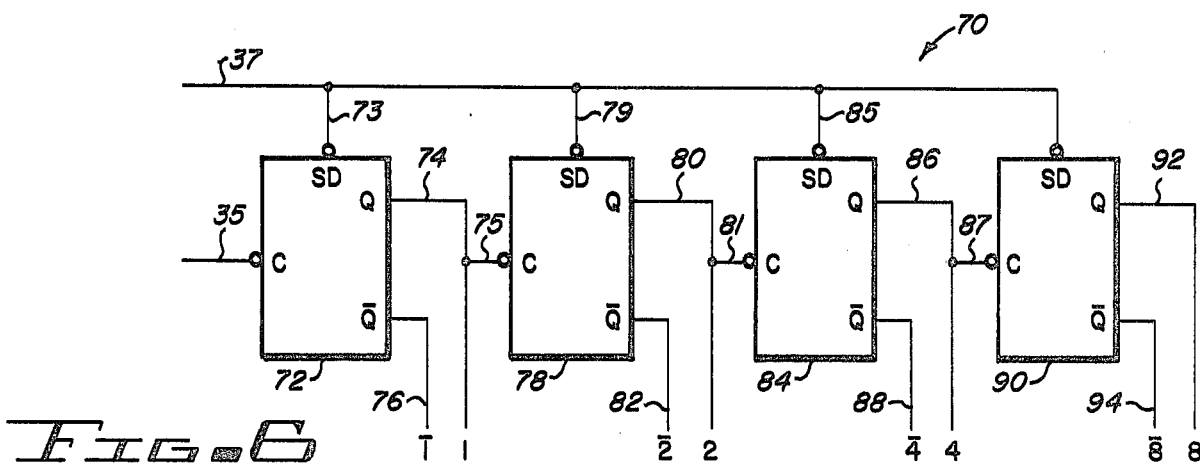
FIG. 6 is a schematic circuit diagram of counter apparatus incorporated into the present invention.

FIG. 6 is a schematic diagram of the counter 70 of FIGS. 3 and 4. Four flip-flops are used in the counter to count from one (1) to sixteen (16). The purpose of the counter 70 is to repetitively count horizontal lines in one through sixteen groups or sequences as the raster moves from the top to the bottom of the screen. Each vertical timing pulse will set or synchronize the counts. Pulses from the horizontal timing increment the counter, thus resulting in the counting of horizontal lines.

The four flip-flops, respectively designated flip-flops 72, 78, 84, and 90, are connected together, with the Q output of one flip-flop being connected to the clock or C input of the adjacent flip-flop. Conductor 37 is connected to the SD (set direct) input terminal of each flip-flop. The conductor 37 extends directly to the SD of flip-flop 90, while flip-flop 72 is connected to conductor 37 by conductor 73. Conductors 79 and 85 extend from conductor 37 respectively to the SD terminals of flip-flops 78 and 84. Vertical timing pulses are transmitted on conductor 37 for purposes of setting directly the counter each time a vertical timing pulse is present at the television transmitter for video scrambling or encoding apparatus, as shown in FIG. 3. The vertical timing pulses to conductor 37 may be supplied from an appropriate transmitter vertical timing pulse, such as the vertical sync signal. At the receiver for the unscrambling or decoding apparatus, the vertical timing pulses on the set direct line of the counter 70 are received from the conductor 106 of the sweep detector 100 (see FIGS. 4 and 5).

The counter is incremented by horizontal timing pulses which are present on conductor 35, as shown in FIGS. 3 and 4, to the clock input of the first flip-flop 72. At the television transmitter (scrambling apparatus) horizontal pulses to the conductor 35 are provided by an appropriate transmitter timing pulse such as at the horizontal sync signal without equilization pulses. At the receiver (the unscrambling apparatus) horizontal pulses to increment the counter are provided by the conductors 102 of the sweep detector 100 (see FIGS. 4 and 5).

Each horizontal timing pulse results in a change of state of flip-flop 72. In the well-known manner, the counter 70 counts from one to sixteen in binary and the counts 1–16 are transmitted to the decoder 96, shown in FIGS. 3, 4, and 7.

Each flip-flop 72 . . . 90 includes two output terminals, a Q output and a Q(not) output. The Q and the Q(not) outputs are connected as inputs to the decoder 96 (see FIG. 7).

Conductor 74 extends from the Q output of flip-flop 72 to the decoder 96, while conductor 76 extends from the Q (not) output terminal of flip-flop 72 to the decoder. Conductor 75 extends from conductor 74 to the C or clock input of flip-flop 78. Accordingly, the Q output signal level of flip-flop 72 is transmitted to the decoder 96 and also to the C input of flip-flop 78.

Conductor 80 extends from the Q output of flip-flop 78 to the decoder, and the conductor 82 extends from the Q(not) output of flip-flop 78 to the decoder. Conductor 81 extends from conductor 80 to the C input of flip-flop 84.

Conductor 86 extends from the Q output of flip-flop 84 to the decoder 96, as shown in FIG. 7, while conductor 88 extends from the Q(not) output terminal of flip-flop 84 to the decoder. Conductor 87 extends from conductor 86 to the C input terminal of flip-flop 90.

Flip-flop 90, the fourth flip-flop in the counter, is connected directly to the decoder 96 with conductors 92 and 94 extending from the Q and the Q(not) outputs to the respective inputs of the decoder.

The counting in binary is accomplished by the counter through the respective outputs of the flip-flops 72 . . . 90. The binary count from each of the flip-flops is dsignated according to the output signal level (high or low voltage) from each flip-flop output. The first flip-flop 72 is assigned a weight of 1, the second flip-flop 78 is assigned a weight of 2, the third flip-flop 84 a weight of 4, and the fourth flip-flop 90 a weight of 8. An adding combination of the four numbers (1, 2, 4 and 8) can be found to yield each count 1 through 16. For example, the count 7 is designated by adding 1+2+4. If the flip-flops representing the 1, 2, and 4 counts are all true with high outputs from the Q terminals, the counter is at a count of 7.

The output from the Q terminal of flip-flop 72 on conductor 74 is designated by the numeral 1, while the output from the Q(not) terminal of flip-flop 72 on conductor 76 is designated by the numeral 1(not). The outputs from the Q and Q(not) terminals on the output conductors of flip-flops 78, 84, and 90 are designated respectively as 2, 2(not), 4, 4(not), and 8, 8(not). Each flip-flop, though it only has two outputs, represents a count doubled numerically, of the value of the previous flip-flop, with the first flip-flop being designated with the numeric value of 1.

Because of the nature of the decoder 96, Q(not) signals (inverted counts) must be supplied along with the Q counts. For any given count in each flip-flop, the Q(not) output is the opposite in voltage value from what the Q output is. Accordingly, when the Q output changes from a high to a low voltage output, the Q(not) output changes from low to high, and vice versa. The Q flip-flop outputs are used in the counter in two ways; one is to designate the count to the decoder 96 and the other is to increment or clock succeeding flip-flop stages in the counter. When the Q output of a flip-flop changes from low to high there is no change in the output of the next succeeding flip-flop. However, when Q goes from a high to a low level signal the next stage is accordingly clocked and caused to change states. A flip-flop will change its output state when it receives a low going (a pulse transversing from a high voltage level to a low voltage level) signal at the clock input. The flip-flop output will always change under these conditions no matter what its output state might be (Q at a high or low level before the clock pulse).

Each flip-flop stage acts as a divide-by-two element for the clock pulses. For every two negative going pulses to the clock, the Q output puts out one negative going pulse. Hence the counter adds or counts input clock pulses by a dividing scheme.

A counting sequence will be discussed starting with the counter at a full count of sixteen (all Q outputs low and all Q(not) outputs high). It has been shown before that any number 1 through 16 can be established by various combinations of the numbers 1, 2, 4, and 8 respectively, represented by the flip-flops 72, 78, 84 and 90. The number 7 can be yielded by adding 1+2+4. If the counter is to count seven horizontal lines sequentially, seven negative going horizontal timing pulses will sequentially be supplied to the clock input of flip-flop 72 on conductor 35.

The Q output of flip-flop 72 will change seven times, once for each negative going clock pulse at the clock input. However, the Q output changes will not all be negative charging voltages. There will be four changes from a low voltage to a high voltage and three changes from a high voltage to a low voltage. The first horizontal timing pulse causes the Q output of flip-flop 72 to change from a low voltage to a high voltage, and the second horizontal timing pulse causes a change from a high voltage to a low voltage and the sequence continues for the seven pulses. It is the three changes from a high voltage to a low voltage which are capable of acting as clock pulses to the adjacent flip-flop 78.

The Q output of flip-flop 72 will, under these conditions, supply three negative going pulses to the clock input of flip-flop 78. Thus the flip-flop 72 divides seven negative going input clock pulses by two to yield three negative going pulses at its Q output (7÷2=3.5). It should be noted here that a flip-flop stage is not a perfect ÷ element. Remainders of 0.5 are statically interpreted and stored as high level voltages at the Q output of the flip-flop. So in this sense the remainders of 0.5 are not sent on to clock succeeding flip-flops. They remain stored as static high level voltages in the dividing flip-flop. If no remainders result in a ÷ sequence (8÷2=4) the static voltage stored will be a low level voltage at the Q output of the dividing flip-flop. The remainder of 0.5 (7÷2=3.5) is stored in flip-flop 72 as a static high level voltage at its Q output. Previously three negative going pulses from the Q output of 72 to the clock input of 78 resulted in the flip-flop 78 dividing the three negative going pulses by two (3÷2=1.5). Accordingly, the flip-flop 78 sends one negative going pulse to the clock input of flip-flop 84 and the remainder of 0.5 (3÷2=1.5) remains stored in flip-flop 78 as a static high level voltage at its Q output.

The one negative going voltage from the Q output of flip-flop 78 to the clock input of 84 results in the Q output of flip-flop 84 changing from a static low level voltage to a static high level voltage. Now all three flip-flops 72, 78 and 84 have static high level voltage at the Q outputs. The flip-flops 72, 78, and 84 in their true or high level output state represent, respectively, a value or weight of one, two, and four. Since the sum of one, two, and four is seven, the decoder interprets the output of the three flip-flops to comprise or define a count of seven.

Other counts in the counter are represented in the same way. For the count of eight, the Q output of flip-flop 90 will be a true high level voltage while the Q outputs of flip-flops 72, 78, and 84 will be low level voltages. Flip-flop 90 has a weight of eight and since it is the only one that is a true or high, the decoder decodes a count of eight from the counter.

The described counting sequence continues until a count of sixteen is reached. A count of sixteen results in all of the Q outputs going low. The seventeenth horizontal pulse on conductor 35 then causes the Q output of flip-flop 72 to go high, and the Q(not) output to go low. This condition, as discussed above, defines a count of one and the counter begins again to count to sixteen.

In the manner discussed, the four flip-flops in the counter 70 accordingly are able to count from one to sixteen repetitively until they are set to a predetermined count (as will be discussed below) by a vertical timing pulse on conductor 37. This predetermined setting of the counter is necessary to maintain synchronization between counters in both the scrambling and unscrambling apparatus of the present invention.

In actual application, the counters in the unscrambling apparatus 20 are set according to the characteristics of each TV receiver when the counter 70 is used in the environment of FIG. 4. The counter is set directly to a predetermined count in accordance with the vertical delay of the particular TV set. The time in which a particular TV receiver responds to the transmitter vertical synchronization varies from receiver to receiver. If the counter in the scrambling apparatus 10 and the counter in the unscrambling apparatus 20 are to remain synchronized with each other, this variation in vertical response must be compensated for. In order to compensate for such variation in time, the counter 70 of FIG. 4 is set by the vertical timing to a predetermined count for a particular TV set. In accomplishing the predetermined count setting, the four conductors 37, 73, 79 and 85 may or may not be connected to the set direct inputs of their respective flip-flops, one or the other. In other words, to set a counter to a particular count when a vertical timing pulse is received, some of the flip-flops are in the proper state for synchronization. The flip-flops which are in the wrong state will be connected to the conductor 37 for setting directly to the proper state for synchronization.

The diagram in FIG. 6 assumes that the delay for the vertical response is such that all of the flip-flops in the counter should be set directly. Since this may or may not be true, each counter 70 in the unscrambling apparatus 20 will be individually set at time of installation. This may be accomplished by well known means.

After being reset by a vertical timing pulse, the counter identifies or counts horizontal video lines and assigns a number to each line in each group of sixteen lines. The counter only counts from one to sixteen, and accordingly more than one horizontal line will be assigned a given number or count by the counter. For example, dividing 262½ lines per field by sixteen results in sixteen and a fraction remainder (262.5÷16=16+). Therefore, there will be sixteen horizontal lines assigned or designated as the number eight line during each field. That is, the eighth line in each group of sixteen lines is the number eight line, and since there are sixteen groups of sixteen lines, there will be sixteen number eight lines, or sixteen lines designated as a number eight line. It follows that the number eight line in corresponding groups in each field will be adjacent lines when the lines of the two fields are interlaced. When the counter reaches a full count of sixteen, the next horizontal timing pulse causes the counter to increment to a count of one and to begin counting from one to sixteen over again. All number eight lines in each group of sixteen lines will be encoded alike, either negative image or positive image, depending on the code assigned for the number eight line by the memory logic 150, as discussed below in conjunction with FIG. 8.

The logic of the four flip-flops in the counter will respond as follows: The Q output is set to a static high voltage by a low going signal applied to the set direct (SD) input. At the same time the Q(not) output goes to a static low voltage. A low going clock pulse to the clock (c) input will cause the Q and Q(not) outputs to change their states no matter what static voltage the outputs may be in. The set direct inputs to each flip-flop have internal capacitive coupling to eliminate the effect of set direct pulse width on counting. The two signals which operate the counter, horizontal clock pulses and vertical set direct pulses, are of independent origin. Sometimes under such clocking conditions the counter may receive simultaneously a clock pulse on conductor 35 and a set direct pulse on conductor 37. Depending on signal stability, the counter may lose synchronization. One scanning field may see the SD signal on conductor 37 arriving just slightly before the clock pulse on conductor 35, while the next field may see the SD signal on conductor 37 arriving just slightly after the clock pulse on conductor 35. If this problem develops, steps can be taken to slightly delay one of the signals so that the relative delay between each signal is greater than the relative signal jitter. This is accomplished through well known means and can be done either at the counter or at the vertical and horizontal sweep detector 100 (see FIGS. 4 and 5).

Figure 7A:
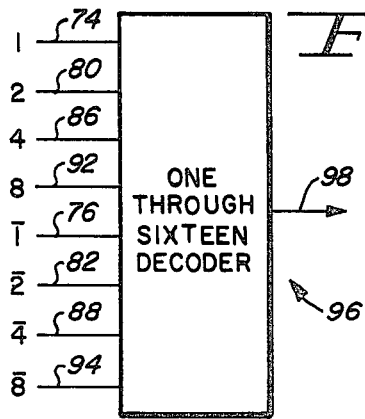
FIGS. 7a and 7b are schematic circuit diagrams of decoder apparatus incorporated into the present invention.
Figure 7B:
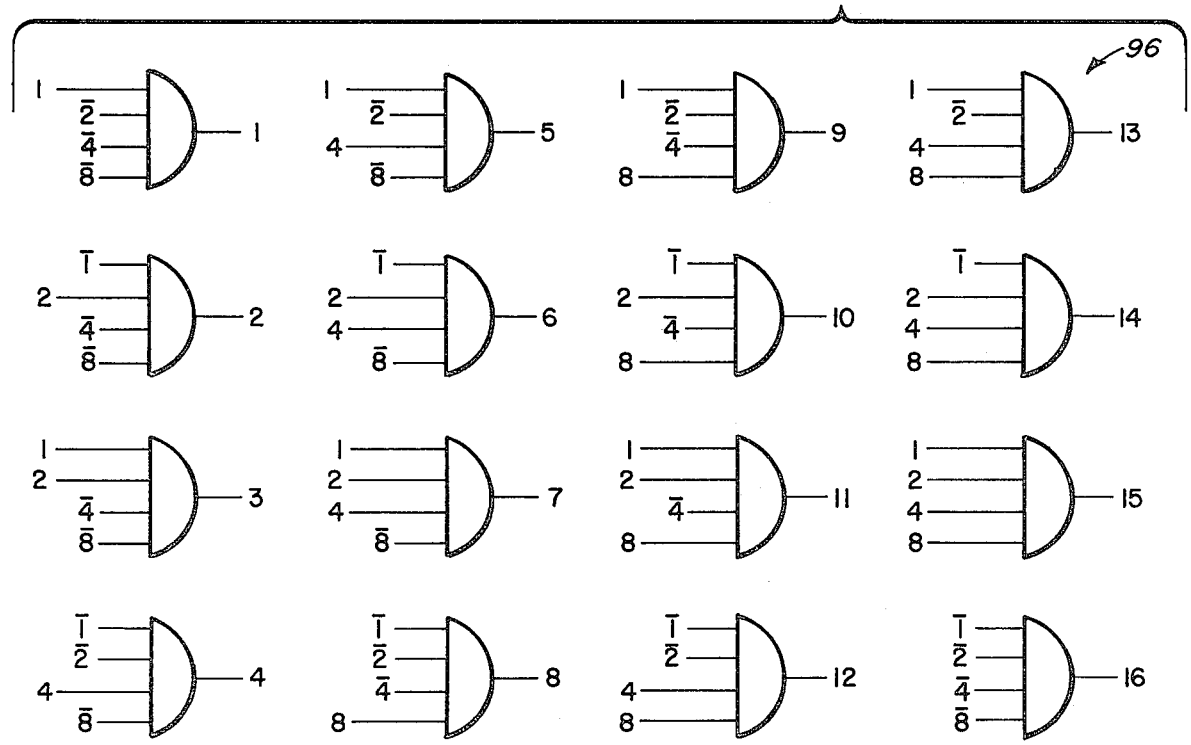

FIGS. 7a and 7b are diagrams schematically representing the decoder 96. The purpose of the decoder 96 is to decode or establish the count present in the counter at any given time. The decoder is represented in FIG. 7a as a commonly available integrated circuit. The input conductors 74, 76, 80, 82, 86, 88, 92, and 94 are connected to, and extend from, the counter 70, therefore transmitting the outputs of the flip-flops in the counter to the decoder, as shown in FIGS. 3, 4, and 6. The numeric outputs 1, 1(not) ... 8, 8(not) of the counter are shown by the respective input conductors to the decoder 96. The inputs to the decoder are the Q and Q(not) outputs from the flip-flops 72, 78, 84, and 90 of FIG. 6. The respective decoder inputs correspond and are connected to the respective counter outputs.

The outputs from the decoder 96 are transmitted on a plurality of sixteen conductors, illustrated for convenience in FIGS. 3, 4, and 7a as a single conductor 98.

The one through sixteen decoder 96 actually comprises sixteen AND-gates, shown in detail in FIG. 7b, with each AND-gate including four inputs. Each output, Q and Q(not), from each flip-flop in the counter 70 is connected to one input of eight different AND-gates in the decoder 96. The appropriate combination of the four input signls to each AND-gate signals a specific count, and in that manner each of the counts one through sixteen is decoded by the respective AND-gates of the decoder 96. For example, the count of seven is decoded by the particular AND-gate which has its inputs connected the the 1, 2, 4 and 8(not) counter outputs. Under these conditions the designated AND-gate will have all four of its inputs at a high level when the counter reaches a count of seven. This is turn qualifies the AND-gate and causes it to put out a high level signal during the count of seven.

The output conductor 98 accordingly represents sixteen outputs, one output of which is connected to, and thus extends from, each AND-gate in the decoder 96. Each AND-gate responds to the appropriate combination of its four inputs from the respective flip-flops in the counter to decode its particular count. Since there are sixteen AND-gates, each AND-gate will respond only once when the counter counts from 1 to 16, and each AND-gate will respond to only one combination of four input signals to provide an appropriate output designating a specific count of the counter.

Figure 9:
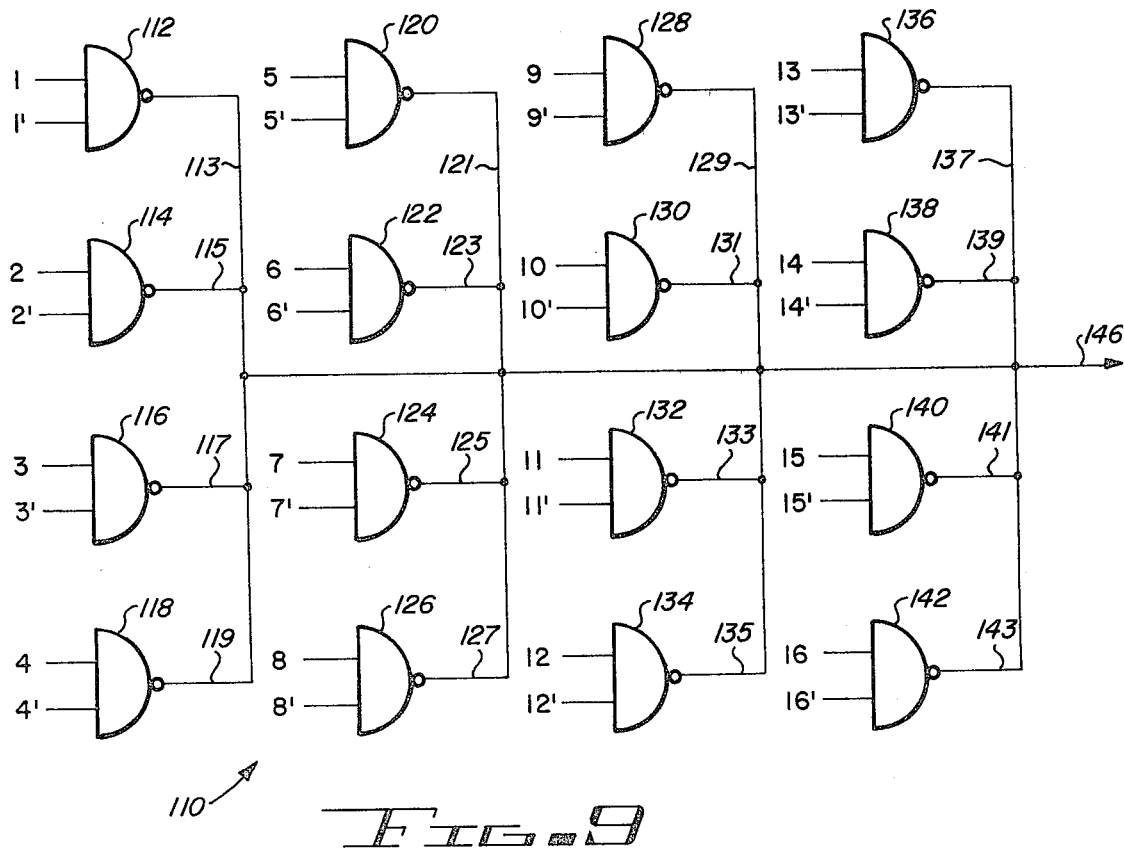
FIG. 9 is a schematic circuit diagram of positive or negative image decision logic incorporated into the present invention.

The decoded counts, comprising the output of the decoder, are transmitted through the sixteen conductors 98 to the positive or negative image decision logic 110, illustrated in FIG. 9.

In FIG. 7b, the decoder is shown in detail as sixteen AND-gates, each with four inputs and a single output. The output of each of the sixteen AND-gates represents a single count from one to sixteen, and accordingly each AND-gate may be readily and easily identified by its numerical count rather than by a reference numeral.

The conductors from the Q and the Q(not) output terminals of the four flip-flops in the counter 70 of FIG. 6 are shown connected to the AND-gates of the decoder in FIG. 7b, with the appropriate numeric designations as given in FIG. 6. The same numeric designations are shown in FIG. 7a, and are also identified with a corresponding reference numeral for each flip-flop output line or terminal. However, all eight common numeric connections to the decoder AND-gates are shown in FIG. 7b, while only a single connection to each flip-flop output terminal is shown to the decoder 96 in FIG. 7a.

In FIG. 7a only a single output conductor 98 is shown for the decoder 96. In FIG. 7b the decoder output for each AND-gate is shown with the numeric value of its decoder count. It is understood that the output conductor 98 of FIG. 7a comprises the sixteen discrete output conductors of FIG. 7b, or one conductor from each AND-gate output terminal.

The AND-gates in FIG. 7b require four high input signals to be qualified in the AND function. When qualified, the AND-gates put out a true high level output signal.

Figure 8B:
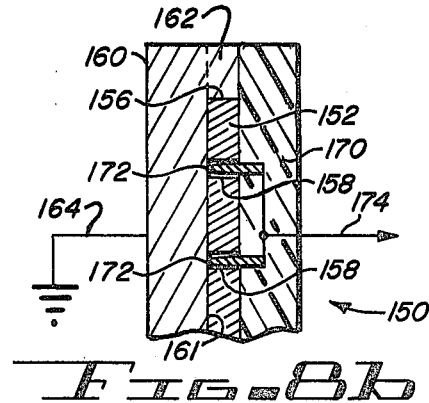
FIGS. 8a and 8b are schematic circuit diagrams of code memory logic apparatus incorporated into the present invention.
Figure 8A:
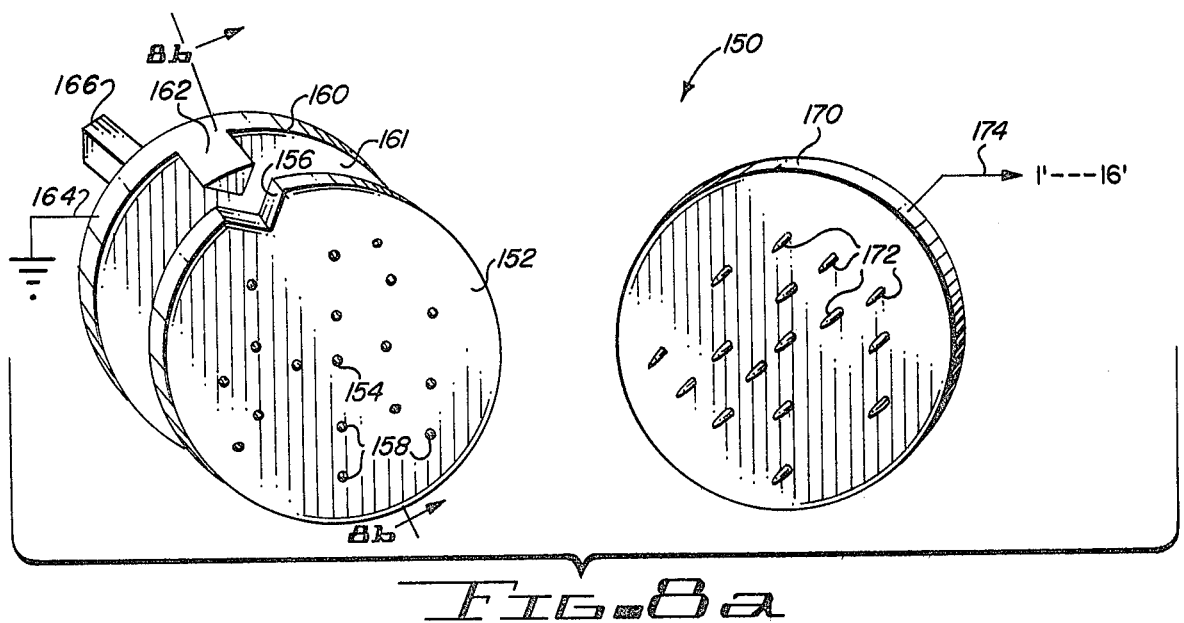

FIG. 8a comprises a schematic representation of the code memory logic 150, which includes a memory disc 152, a metal ground plate 160, and a data pickup element 170. The data pickup element 170 and the ground plate 160 are spaced apart slightly to allow for the insertion therebetween of the memory disc 152, which is a nonconductive element.

The purpose of the code memory logic 150 is to establish the coded format for scrambling or decoding a particular television program. The coded format is established by selectively inverting the video of predetermined horizontal lines as discussed below.

The memory disc 152 is preferably circular in configuration, and made of relatively thin but stiff non-conductive or insulative material, such as paper, cardboard, plastic or the like. The thickness of the memory disc 152 is substantially exaggerated for purposes of clarity in FIGS. 8a and 8b.

The disc 152 includes a center aperture 154 which receives a spindle or axle for convenience in rotating the memory disc for the purpose of changing codes. The disc 152 also includes an indexing notch 156 on its outer periphery. The indexing notch cooperates with an index tab 162 on the metal group plate 160 to appropriately index or locate the memory disc with respect to the ground plate. The index tab 162 extends upwardly from an outer surface 161, which is a flat, planar surface, against or on which the encoded disc 152 is disposed. The ground plate 160 also preferably includes a central aperture coaxial with the aperture 154 of the memory disc 152 so that the disc and the ground plate may be aligned and rotated together.

A plurality of apertures 158 extend through the disc 152. There are seventeen apertures illustraed in FIG. 8a, but the number of apertures may vary from as few as one to as many as convenient or as desired. The purpose of the apertures is to allow electrical contact between a pickup switch contact 172 and the ground plate 160.

The data pickup element 170 includes sixteen (16) pickup switch contacts 172 which may or may not extend through apertures 158 of the memory disc 152 to make electrical contact with the ground plate 160. Whether electrical contact is made depends on the relative position of the apertures in the disc 152 with respect to the switch contacts of the element 170. If a switch contact is in registration with and accordingly extends through an aperture 158, the switch contact makes electrical contact, and is accordingly grounded, with the ground plate 160, which is grounded, as indicated by the schematic representation of grounded conductor 164.

There are sixteen switches or switch contacts 172 in the data pickup element 170. Each switch is connected by a conductor to the positive or negative image decision logic 110 (see FIG. 9). There are accordingly sixteen conductors extending from the data pickup element 170 to the positive or negative image decision logic 110. However, for clarity, the sixteen conductors are illustrated in FIG. 8a as a single conductor 174.

A single one of the switches 172 is connected to a single NAND-gate in the positive or negative image logic 110 by a single one of the conductors which comprise the illustrated conductor 174. The code memory logic connections to each one of the NAND-gates in FIG. 9 is illustrated by a numeric designation with an adjacent prime (') superscript.

When the nonconductive memory disc 152 is inserted into the memory logic 150, and indexed appropriately on the ground plate 160, or all, of the switches 172 may make physical contact with the memory disc. When an aperture 158 is aligned with a switch contact 172, the switch contact extends through the aperture and makes electrical contact with the ground plate 160, which in turn grounds that particular switch contact and accordingly provides a ground to a specific NAND-gate of the positive or negative image decision logic 110 (see FIG. 9).

The apertures or holes 158 appear to be disposed in random fashion, but in actuality they are located to provide alignment which the switches in accordance with a predetermined code. Each switch corresponds to one line of each sixteen line scan, as discussed in detail above. Accordingly, when a switch grounds out to the plate 160 through an aperture in the memory disc, the ground signal is transmitted to the respective NAND-gate in the positive or negative image decision logic 110. When code memory data is combined with an appropriate signal from the decoder 96 the image decision logic 110 then encodes the video signal of a particular line of each sixteen line scan, as has been discussed in detail above. Obviously, more than one line may be so encoded. With the sixteen binary digits used herein for coding purposes, there are 65,536 possible combinations. That is, there is a possibility of 65,536 combinations of the sixteen binary digits for coding purposes. Each code could accordingly provide the encoded format for a particular TV program.

Various combinations of the sixteen digits, or combinations of the 65,536 possible codes, may be employed using holes or apertures in various locations in the memory disc 152. A particular program can be selected by rotating the memory disc and the ground plate to provide registration with the appropriate, preselected or predetermined switch, or switches, 172 of the data pickup element 170.

For illustrative purposes, a month's programming may be purchased on a pre-punched memory disc which includes the proper coded information in terms of apertures 158 for specified programs. The relative position, in terms of indexed settings, between the data pickup element 170 and the memory disc 152, may be specified for selective programs in the instructions for the particular time period.

The location of the switches 172 on the data pickup element 170 may be in a predetermined or preselected location or orientation. Such location or orientation may vary from decoder to decoder to provide additional security. Thus the same basic code would be differently presented on the memory disc for different TV sets. This would require a correlation between the pickup elements and the memory discs for each different set. However, the result would be the same for all sets because the basic code is the same. In other words, the same lines are inverted for all sets for a particular program code. However, the data pickup switches are located or oriented differently from set to set for security purposes. (A person could not reproduce a program disc from his neighbor's program disc.) The memory disc for each user or customer is encoded for the specific pickup element employed in his set. Several thousand variations of the pickup switches may be marketed for best security.

For indexing the ground plate 160 and the code memory disc 152 relative to the data pickup element 170 for changing the particular code employed for a program, a week or a month, an index pointer 166 is shown extending upwardly from the ground plate 160. As previously indicated, the plate 160 and the disc 152 are rotated relative to the data pickup element 170.

FIG. 8b comprises a view in partial section through a portion of the ground plate 160, the disc 152, and the pickup element 170, taken generally along line 8b of FIG. 8a. The ground plate, disc, and pickup element are shown assembled together, with a pair of switch contacts 172 extending through apertures 158 in the disc 152 to make electrical contact with ground plate 160.

Both FIGS. 8a and 8b show switch contacts 172 as pointed, straight pins for simplicity. In actuality, the contacts are preferably curved, springly teeth that allow relative rotation between the pickup element 170 and the ground plate and disc. The contacts accordingly flex to move in and out of the apertures during relative rotation and, if no mating aperture is present in the disc 152 to allow the contacts to ground against the plate 160, the contacts remain on the surface of the nonconductive disc 152.

FIG. 9 comprises a schematic circuit diagram of the positive or negative image decision logic 110, sometimes referred to herein as "image logic", shown as a block in FIGS. 3 and 4. The purpose of the image logic is to interrogate or call up horizontal line image data in the code memory logic 150. The image data is the coded format used for scrambling or unscrambling a particular television program. Scrambling and unscrambling are accomplished by inverting the video signals of various horizontal lines in each sixteen line group as counted by the counter 70. Sixteen data lines from the code memory logic 150 are sequentially called up by the decoder 96 to provide video polarity data for each of the sixteen horizontal lines counted by the counter.

The positive or negative image decision logic 110 comprises sixteen NAND-gates, each of which NAND-gates includes two inputs. Each NAND-gate has an input which is connected to a single NAND-gate output in the decoder 96 (see FIG. 7b). Accordingly, a single decoded count from the counter 70 (see FIGS. 3, 4, and 6), as decoded by the decoder 96, comprises one of the two qualifying inputs to each NAND-gate of the image logic 110.

The output of the decoder 96, illustrated in FIGS. 3, 4, and 7a as a single conductor 98, actually comprises sixteen discrete conductors, one for the output of each NAND-gate in the decoder, as illustrated in FIG. 7b. There are sixteen matching NAND-gates which comprise the image logic 110. One qualifying input for each NAND-gate is a single decoded count from the decoder 96. The NAND-gates, then, of the decoder 96, are matched on a one-for-one basis with the NAND-gates of the image logic 110. A single or specific count output from the decoder 96 is the input to each respective single or specific NAND-gate in the image logic 110. The inputs from the decoder 96 are identified in FIG. 9 by their numeric counts 1 through 16.

The second input to each of the NAND-gates in the image logic is an output signal from the code memory logic 150 (see FIGS. 3, 4, and 8). The signals from the memory logic 150 to each NAND-gate in the image logic 110 are identified by a prime (') designation after the number. Input signals from the code memory logic identify a particular line or lines of each sixteen line group for inversion or codification. The particular code employed, as discussed above in conjunction with FIG. 8, determines which line or lines should be encoded or scrambled by inversion.

The image decision logic as illustrated in FIG. 9 comprises sixteen separate NAND-gates numbered respectively 112, 114, 116, 118, 120, 122, 124, 126, 128, 130, 132, 134, 136, 138, 140, and 142. The NAND-gate 112 has for its input two terminals, one of which is connected to the decoder 96 (see FIG. 7) through one of the sixteen output conductors 98 from the decoder. In FIG. 9, the number "1" is adjacent one of the inputs for the NAND-gate 112. This signifies that the decoded count of "1" comprises one of the inputs to the NAND-gate 112. The other input to the NAND-gate 112 is one of sixteen conductors 174 from the code memory logic 150, as shown in FIGS. 3 and 4, and as shown and discussed in conjunction with FIG. 8, above.

NAND-gate 112 provides a qualified output when there is simultaneously an appropriate input indicating the decoded count of one (1) and an appropriate input on the line identified as 1'. The 1' input is from the code memory logic which signifies, according to the particular code employed by the memory, that line one out of each sixteen-line group should be inverted, or not invertd, depending on the level of the signal on conductor 1'.

Figure 12:
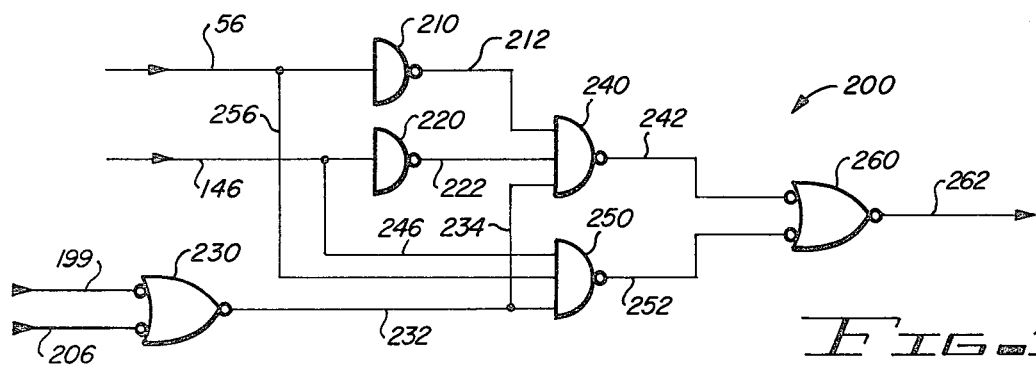
FIG. 12 is a schematic circuit diagram of complementing logic incorporated into the present invention.

The output from the NAND-gate 112 is transmitted by a conductor 113 to a conductor 146 which extends from the image logic 110 to the complementing logic 200 (see FIGS. 3, 4, and 12).

Each of the NAND-gates 112 . . . 142 includes a single output conductor which is connected to the common output conductor 146. The conductors which connect the output of the NAND-gates 112 . . . 142 to the conductor 146 are designated, respectively, 113, 115, 117, 119, 121, 123, 125, 127, 129, 131, 133, 135, 137, 139, 141, and 143. It will be noted that conductors 113, 119, 121, 127, 129, 135, 137, and 143 are connected directly to the conductor 146. The conductors 115 and 117 are respectively connected to the conductors 113 and 119; the conductors 123 and 125 are respectively connected to the conductors 121 and 127; the conductors 131 and 133 are respectively connected to the conductors 129 and 135; and, finally, the conductors 139 and 141 are respectively connected to the conductors 137 and 143.

The output signal on conductor 146 to the complementing logic authorizes the video inverter to invert a particular line of the scan and is correlated with a particular NAND-gate output in the image logic 110.

In order to invert any given line of each sixteen line group of lines, the NAND-gate corresponding to the particular line in a sixteen line group must provide an appropriate output on conductor 146 to the complementing logic 200. Such appropriate output results from an NAND-gate when the gate receives two simultaneous inputs, one from the decoder 96 signifying the count of the particular line in a sixteen line group, and the other from the code memory logic 150, signifying a particular, predetermined line for inversion according to the code employed. As indicated heretofore, any number of the lines in a sixteen line group may be inverted. Moreover, as also indicated heretofore, the sixteen lines are merely arbitrary and convenient. The same principles as outlined herein may be employed with a scanning code using more or less than sixteen lines. In such case the counter 70 and decoder 96 would count to and decode more or less than sixteen.

As used herein, the term "scanning code" refers to the selective inversion of video information of certain horizontal lines out of a group of lines counted by the counter. In the discussion of the present invention, a group of sixteen lines is used. The counter sequentially counts 1 through sixteen (one count for each line) over and over again as the raster progresses down the screen. A particular code is thus employed by selectively inverting some (one or more) of the lines in each group of sixteen lines.

Since a group of sixteen lines is employed in the present invention, sixteen NAND-gates are employed in the image logic 110. With one NAND-gate paired with one particular line, it will be noted that when a particular NAND-gate is true, that is, when it is qualified with high signals on both inputs, its output is low. All outputs are wired together, thus resulting in a "hard-wire-OR-gate" connected to all NAND-gate outputs. This is a common practice in logic design. ORing the output of all the NAND-gates together results in one composite signal which sequentially makes up the scanning code on the single conductor 146. This composite signal commands (through the complementing logic 200) the inversion of video inverters 300, 302, and 304. (See FIGS. 3, 4, and 13.) The video inverter responds to each decoded count of the decoder 96 in accordance with data present from the code memory logic 150.

Figure 10:
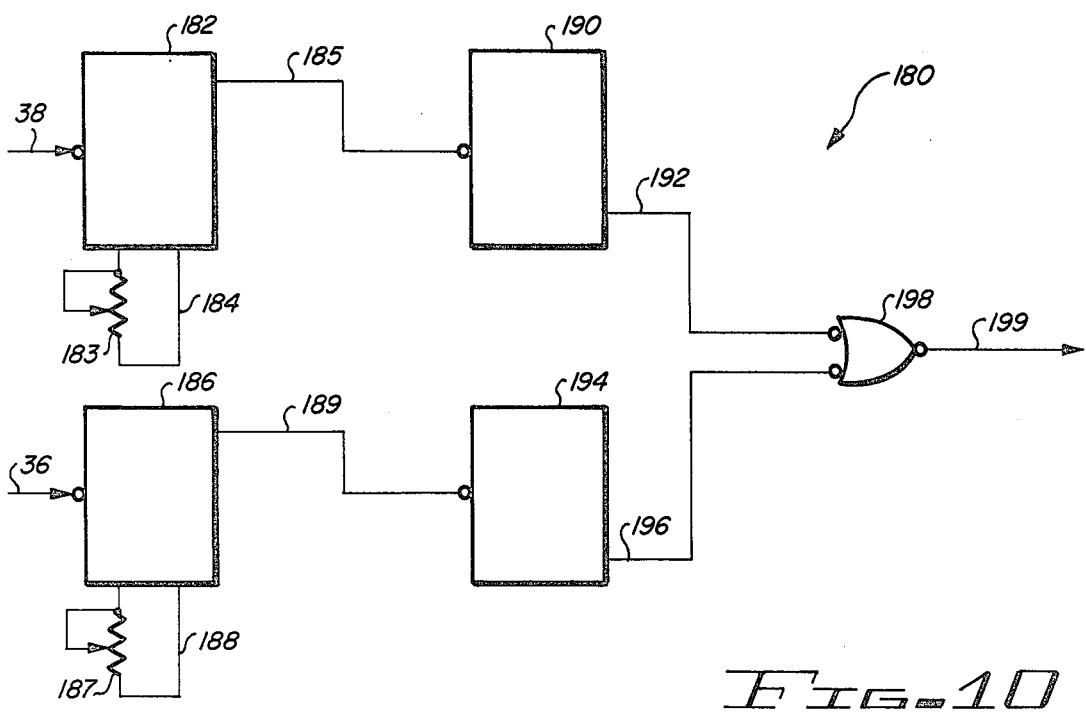
FIG. 10 is a schematic circuit diagram of blanking pulse detector apparatus incorporated into the present invention.

FIG. 10 comprises a schematic diagram of the blanking pulse detector 180. The purpose of the blanking pulse detector is to insure that the scrambling and unscrambling apparatus of the present invention operate in the positive video image mode only during vertical and horizontal blanking times. This is necessary (with composite video recording tape) to prevent the transmission of synchronization and blanking pulses in the negative or inverted image. Moreover, the unscrambling apparatus at the receiver must not be allowed to invert the normal positive blanking pulse when a negative or inverted video line is being decoded or unscrambled.

The detector 180 of FIGS. 3 and 4 comprises four multivibrators 182, 186, 190, and 194, all of which are of the one-shot or astable type. Multivibrators 182 and 186 are connected respectively to multivibrators 190 and 194 by conductors 185 and 189. Thus the respective outputs of multivibrators 182 and 186 comprise the inputs which trigger the mutivibrators 190 and 194. The outputs of multivibrators 190 and 194 are connected to the inputs of OR-gate 198 by a pair of conductors 192 and 196, respectively. The output of the OR-gate 198 is in turn transmitted to the complementing logic (see FIG. 12) by a conductor 199.

The input to the multivibrator 182 comprises a negative going horizontal timing pulse on conductor 38 (see also FIGS. 3 and 4), and the input to multivibrator 186 is a negative going vertical timing pulse on conductor 36 (see also FIGS 3 and 4).

As previously stated, the purpose of the blanking pulse detector is to prevent the inversion of the vertical and horizontal blanking and sync pulses by the scrambling apparatus 10 of the present invention. This is necessary because television receivers cannot process inverted blanking and sync pulses due to the threshold "pick-off" circuitry in the receiver. The beginning and ending of the video portion of a composite signal is transmitted according to the positive and negative scanning code being used, while the blanking and sync pulses at the end of the video are allowed to be processed in their correct, positive state. Hence it is necessary to detect the blanking and sync pulses in order to prevent their inversion.

With the horizontal and vertical timing pulses triggering the multivibrators 182 and 186 in the detector apparatus 180, the timing out period of the multivibrators, which is the time the multivibrators are in their unstable state, is set to coincide with the beginning of the next or following blanking pulse in anticipation of its arrival. That is, the apparatus works in an anticipation mode rather than in a current time mode to prevent the inversion of the blanking and sync pulses. This design approach allows for a variety of signals for activating the blanking pulse detector. For example, at the transmitter, either a horizontal blanking or a horizontal sync pulse may be used to activate flip-flop 182, both of which occur at different times as long as potentiometer 183 is adjusted to account for the time difference between the two signals. In the decoding apparatus at the TV receiver, this design approach is necessary to allow for variations in times from the sweep detector 100 (see FIG. 4).

Since both vertical and horizontal blanking and sync pulses are involved and must be transmitted in positive form, two pairs of multivibrators are used with a single OR-gate, which passes appropriate signals from either or both pairs of mutivibrators.

The astable multivibrator 182 is triggered by the low going horizontal timing pulses on conductor 38. When the multivibrator 182 is triggered, it goes from its stable state to its unstable state, which results in a high output on conductor 185 to multivibrator 190. The multivibrator 190 is also of the astable type, and its output goes low during its unstable state or timing out period. Multivibrator 190 is triggered to its unstable state by the low going output of multivibrator 182 as it returns to its stable state at the end of its unstable timing out period.

The timing out period, or time period in which the multivibrator 182 is unstable, is adjusted by potentiometer 183. The potentiometer 183 is connected to the multivibrator 182 by conductor 184. The unstable state of the multivibrator 182 is adjusted to include the time period during which video information is transmitted in the apparatus. As adjusted by potentiometer 183, the multivibrator returns to its stable state shortly before the beginning of the next horizontal blanking pulse. The next low going horizontal timing pulse on conductor 38 again triggers the multivibrator 182 to its unstable state.

The low going output signal from the multivibrator 182 in turn triggers the multivibrator 190, resulting in a low output from the multivibrator 190 to the OR-gate 198. The output of the multivibrator 190 is accordingly the reverse of that of the multivibrator 182. In other words, the output of multivibrator 190 during its timing out or unstable state is low, and its output in its stable state is high. The low output during its unstable state is transmitted on conductor 192 to the OR-gate 198. The unstable state of multivibrator 190 is designed to the time duration of a standard horizontal blanking pulse width.

The OR-gate 198 allows the low output of the multivibrator 190 to be transmitted on conductor 199 to the complementing logic, discussed below. The low output signal on conductor 199 to the complementing logic results in a cessation of video inversion and allows the blanking and sync pulses to be transmitted in their normal, positive form.

Multivibrators 186 and 194 operate in substantially the same manner as the multivibrators 182 and 190. The multivibrators 186 and 194 cooperate with OR-gate 198 to prevent the inversion of vertical blanking and sync pulses by anticipating the arrival of the vertical blanking and sync pulses.

Vertical timing pulses are received by the multivibrator 186 on conductor 36. The multivibrator 186 is triggered by the negative going portion of the vertical pulse and, when triggered, goes from its stable to its unstable state. The output from the multivibrator 186 is low in its stable state and is high in its unstable state. Accordingly, when the multivibrator is triggered, its output on conductor 189 goes from low to high and remains high during the timing out period of the multivibrator.

A potentiometer 187 is connected to the mutivibrator 186 by a conductor 188. The potentiometer 187 is used to adjust the timing out or unstable period of the multivibrator 186 to a length of time slightly less than one complete field.

The output from multivibrator 186 to multivibrator 194 is high during the unstable time period of the multivibrator 186. When the multivibrator 186 again switches to its stable state, its output on conductor 189 to the multivibrator 194 goes from a high output voltage to a low output voltage. The low going output of the multivibrator 186 in turn triggers the mutivibrator 194 to its unstable state.

The output of multivibrator 194 is high in its stable state and is low in its unstable state. Therefore, when it is triggered from its stable state to its unstable state, its output goes from high to low. The output of multivibrator 194 is in turn transmitted to the OR-gate on a conductor 196. When the conductor 196 transmits a low output from the multivibrator 194, the low output passes through the OR-gate 198 and is transmitted to the complementing logic on conductor 199 to prevent the inversion of the vertical blanking and sync pulses. The unstable state of multivibrator 194 is designed to a time duration of a standard vertical blanking pulse width.

The OR-gate 198 is qualified to act in the OR function when either or both inputs are low level voltages. Under such conditions the output of the OR-gate 198 will also be a low level voltage on conductor 199 to the complementing logic 200.

Figure 11:
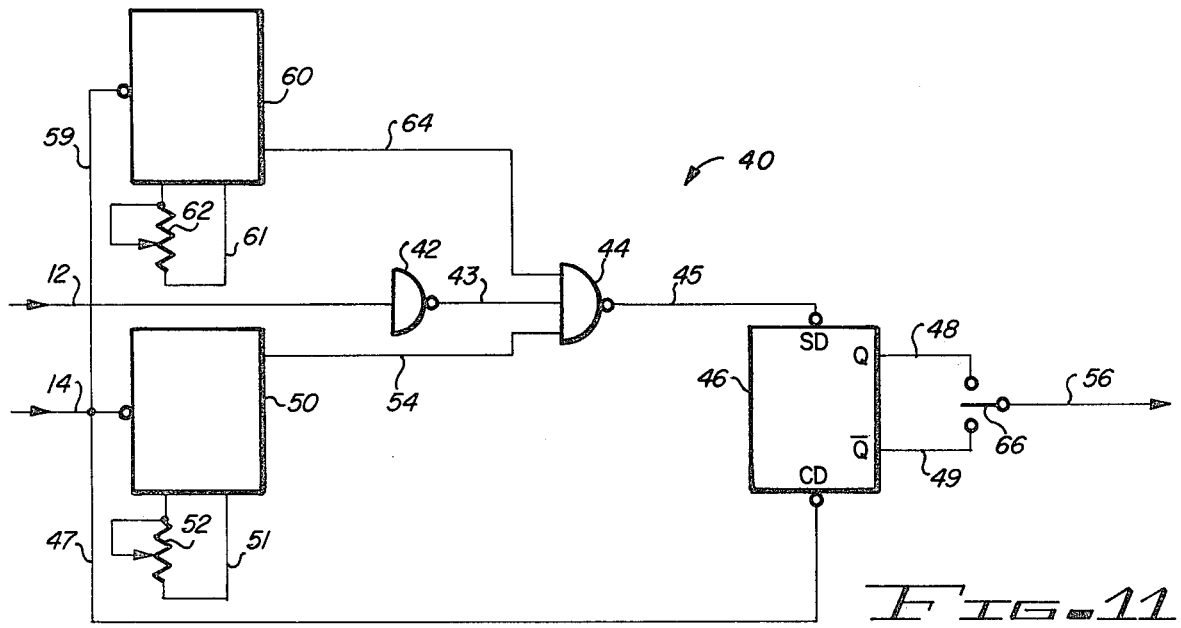
FIG. 11 is a schematic circuit diagram of field detector apparatus incorporated into the present invention.

FIG. 11 is a schematic circuit diagram of the field detector apparatus 40 which, as its name implies, detects which of the two fields is being scanned. The output from the field detector is transmitted to the complementing logic 200 (see FIGS. 3 and 4). The primary function of the field detector is to provide a high level logic signal to the complementing logic 200 during odd field. The complementing logic uses this high level signal to cancel out possible video distortion as explained below in conjunction with FIG. 12.

Odd and even fields start at different positions on a TV screen in order to interlace the horizontal lines. The interlacing is accomplished by making a difference between the time when a vertical sync pulse occurs and when the respective fields start the first horizontal line of their scans. The time differential between the vertical and horizontal sync pulses in odd and even fields is due to a relative shift in the position of the vertical sync pulse rather than a difference in time between horizontal sync pulses. Horizontal sync pulses are regular and continuous without reference to vertical sync pulses.

If the time between a vertical and a subsequent horizontal sync pulse can be ascertained, it can accordingly be determined whether an even field or an odd field is beginning. At the TV transmitter, when a horizontal pulse comes only one-half line after the vertical pulse, the short time interval ($\frac{1}{2}$ line) between the vertical pulse and the next adjacent or following horizontal pulse, signals the beginning of an even field. Conversely, a relatively longer time interval between a vertical timing pulse and the next succeeding horizontal timing pulse indicates the beginning of an odd field. However, when related to the decoding apparatus of the present invention, these time differences between the vertical and horizontal pulses may not be true indicators of the particular field anticipated. This is due to an inherent skew or delay between the timing signals which will be different for each TV receiver and decoder. Therefore, whether the field detector is detecting the beginning of an odd or an even field will have to be determined by inspection and application during the installation of the decoder. By appropriately selecting the output of a bistable flip-flop, the field detector can be caused to appropriately function as explained below.

The inputs to the field detector apparatus 40 comprises the horizontal timing pulses on conductor 12 and vertical timing pulses on conductor 14. The horizontal pulses are transmitted directly to the input of an inverter 42 by conductor 12, and the output of the inverter is transmitted by a conductor 43 to the input of NAND-gate 44. The NAND-gate 44 includes three inputs, one from the inverter 42 on conductor 43, and two inputs from a pair of monostable flip-flops or one-shot multivibrators 50 and 60. Conductors 54 and 64 provide connections from the respective outputs of the flip-flops 50 and 60 to the inputs of the NAND-gate 44. The output from the NAND-gate 44 is transmitted by a conductor 45 to the set direct input terminal of a bistable flip-flop 46. The bistable flip-flop 46 acts as a memory device for the duration of each scanned field (262.5 lines). It is cleared directly at the end of each field by the vertical timing signal on conductor 47. It is then set or not set by a signal on conductor 45. The signal on conductor 45 will, at the beginning of each field, set or not set the flip-flop 46, depending on whether an odd or even field is starting.

Vertical timing pulses are transmitted on conductor 14 to the inputs of the multivibrator or flip-flops 50 and 60 and also to the clear direct input terminal of the bistable flip-flop 46. The conductor 14 extends directly to the input of multivibrator 50, while a conductor 59 extends from the conductor 14 to the input of multivibrator 60, and a conductor 47 extends from conductor 14 to the clear direct input terminal of the flip-flop 46. The vertical pulses on conductor 14 accordingly trigger the one-shot multivibrators 50 and 60 and clear the bistable multivibrator 46.

Both multivibrators 50 and 60 include adjustable potentiometers for adjusting the timing out period of the multivibrators. That is, the time period during which each of the multivibrators 50 and 60 is unstable after being triggered by a vertical pulse may be adjusted by the potentiometers. The multivibrator 50 includes a potentiometer 52 connected to the multivibrator by a conductor 51. The multivibrator 60 includes a potentiometer 62 connected to the multivibrator 60 by a conductor 61. The multivibrators 50 and 60 are both adjustable for up to a maximum time period of slightly more than one full horizontal time period.

The horizontal pulses occur at a constant rate and they are continuous with one pulse per horizontal line or sweep. The horizontal pulses occur much more often than do the vertical pulses, since a vertical pulse occurs only once at the end of each field of $262\frac{1}{2}$ horizontal lines. A vertical pulse may come at the end of a horizontal line (substantially simultaneously or near a horizontal pulse), or a vertical pulse may come about midway along a horizontal line between two horizontal pulses. The position at which the vertical pulse occurs depends on the particular field (odd or even) starting its scan.

The timing out period of the multivibrators 50 and 60 may be adjusted to detect when the horizontal timing pulse comes after a vertical timing pulse. The adjustable one-shot multivibrators 50 and 60 accordingly are used to make an electrical "window" at NAND-gate 44 to select the field which has its first horizontal pulse occurring at the shortest period of time after the vertical timing pulse. The selected pulse accordingly sets directly the flip-flop 46 by way of the enabled NAND-gate 44.

For the decoding apparatus of the present invention, the exact relationship between pulses for each TV receiver is not known. Therefore, an electronic window has to be positioned for each TV receiver. The "window" is varied or positioned by the potentiometers 52 and 62 to select a particular time interval sequence after the vertical pulses. The window is varied or positioned to pick out or to be coincident with the first horizontal pulse occurring after vertical timing. The selected horizontal pulse will be present in the window after every other vertical pulse or always at the beginning of the particular field selected (odd or even). After the window is established, the same time relationship between the vertical and horizontal pulse will hold with respect to the time interval for the beginning of the selected field. Which field is selected by or for the electrical window is immaterial. The selected field, odd or even, is used to set directly the flip-flop 46, as will be explained below. Because it will be unknown which field sets the flip-flop 46, a switch 66 appropriately selects either the Q or Q(not) output of flip-flop 46 to insure that the field detector sends a high level signal to the complementing logic 200 during odd field as explained below.

In application, a low going vertical pulse on conductor 14 to the multivibrator 50 triggers the output of the multivibrator to a high level signal during the unstable state. The high output from the multivibrator 50 is transmitted by a conductor 54 to one of the input terminals of the NAND-gate 44.

The vertical pulse is also transmitted by a conductor 59 to trigger the multivibrator 60. The vertical pulse here causes the output of the multivibrator 60 to go low during the timing out period or unstable state. The low output from the multivibrator 60 is transmitted by a conductor 64 to the third input terminal of the AND-gate 44.

By adjusting the potentiometers 52 and 62, the timing out periods of the two multivibrators or flip-flops 50 and 60 may be adjusted, as desired. Accordingly, the length of time that enabling or high outputs from the multivibrators 50 and 60 are transmitted to the NAND-gate 44 on conductors 54 and 64 may be adjusted as desired. If the timing out period, or the period of instability, of the multivibrator 60 is less than the timing out period of the multivibrator 50, there will be a time period when the NAND-gate 44 receives enabling or high outputs from both of the multivibrators 50 and 60. This is due to the fact that flip-flop 60 is high in its stable state and flip-flop 50 is high in its unstable state. The time period in which both outputs from the multivibrators 50 and 60 are high may be adjusted relative to the vertical timing as desired, by the potentiometers 52 and 62, as above mentioned.

The two one-shot multivibrators 50 and 60 are used to pick out the field with a short time interval between the vertical and horizontal pulses. This is done by enabling the NAND-gate 44 for a short period of time coincident with the horizontal pulse which comes nearest to the vertical timing pulse. When a horizontal pulse is present during the established period, it will be passed by the NAND-gate 44 to set directly the flip-flop 46, thus signalling the presence of a particular field. The next or succeeding field will not set directly the flip-flop 46 because the first horizontal pulse (after the vertical pulse) will not fall within the time period in which NAND-gate 44 is enabled by the two one-shot multivibrators 50 and 60, due to a shift in the relative position of the vertical pulse. With the inputs from the two multivibrators to the NAND-gate 44 both high, a low going horizontal pulse transmitted to the inverter 42 on conductor 12 results in a high signal from the output of the inverter on conductor 43 to the input of NAND-gate 44. However, the NAND-gate 44 will only be enabled by a horizontal pulse when the inputs to the NAND-gate from both multivibrators 50 and 60 are high. If the horizontal pulse enables the NAND-gate 44, a low output from the NAND-gate 44 will be transmitted by conductor 45 to the set direct input terminal of the flip-flop 46. Such a low input to the flip-flop 46 results in a high output from the Q output terminal of the flip-flop 46 on conductor 48. The flip-flop 46 remains set for the duration of the particular field (262½ lines), after which it is cleared by a vertical timing pulse on conductor 47. The first horizontal timing pulse of the next field will fail to set the flip-flop 46 because it will occur at a period of time when the NAND-gate 44 is not enabled by the two flip-flops 50 and 60. Therefore, the bistable flip-flop 46 will remain unset for the duration of that particular field (262½ lines).

From the flip-flop 46, conductors 48 and 49 extend from the Q and Q(not) outputs to the switch 66. A conductor 56 extends from the center top of switch 66 to the complementing logic 200. The switch 66 is used to select the output from the flip-flop 46, according to the characteristics of a particular TV receiver, as explained above. The switch selects the high output from flip-flop 46 during odd field. The switch 66 is accordingly connected to either conductor 48 or 49, according to the characteristics of the particular TV receiver with respect to the odd or even field. The high output from the field detector during an odd field is transmitted from the switch 66 to the complementing logic by conductor 56. The signal on conductor 56 will be low during an even field since the flip-flop 46 will be in the opposite state during this field.

In order that the field detector function correctly in both the scrambling and decoding apparatus of the present invention, the following must be considered. Reference has been made in the above description to vertical and horizontal timing pulses rather than sync pulses. The word "timing" replaces "sync" because the decoding apparatus fails to function if equalization pulses, which are extra horizontal timing pulses present during vertical blanking, are present on conductor 12 of FIG. 11. In the decoding apparatus, no problem exists, since the horizontal timing signals are derived from the sweep detector 100 (see FIG. 5), which generates a synthetic or pseudo "sync" pulse, referred to herein simply as a timing pulse. The sweep detector cannot pick up the equalization pulses since it derives its horizontal pulses directly from the horizontal sweep. The equalization pulses are not present at the horizontal sweep, having been eliminated by the horizontal oscillator in the receiver chassis. The field detector 40 of the scrambling or encoding apparatus at the transmitter station requires horizontal pulses from the basic horizontal oscillator without the equalization pulses, just as does the field detector 40 of the unscrambling or decoding apparatus.

At the transmitter, the vertical pulses supplied to the field detector must not be from the vertical oscillator, but must be vertical timing pulses modified or shifted relative to the horizontal pulses according to the particular field being transmitted.

Particular care must be given to the design of the one-shot multivibrators 50 and 60. Since both multivibrators 50 and 60 are triggered at the same time by the same vertical timing pulse, the time at which both reach their respective unstable states is critical. To prevent possible false indications from the NAND-gate 44, multivibrator 60 must be designed to reach its unstable state (a low level signal) slightly before multivibrator 50 reaches its unstable state (a high level signal). This is done by well-known means by one skilled in the art, such as by a capacitive delay on the output of the multivibrator 50.

Also, the set and clear direct inputs to the bistable flip-flop 46 are designed with internal capacitive coupling to allow for flexibility in the width of the horizontal and vertical timing pulses. This is also well known in the art. The set direct and clear direct inputs to flip-flop 46 respond to negative going low level signals.

The NAND-gate 44 is qualified in the NAND function when all three inputs are a high level signal. When qualified in the NAND function the NAND-gate 44 has a low level signal at its output.

Both multivibrators 50 and 60 are triggered by low going or low level signals. Also, as mentioned above in conjunction with the explanation of FIG. 3, the field detector 40 may not be necessary in the video scrambling apparatus 10. If the field signal information is readily available at the transmitter, the signal may be appropriately supplied to the complementing logic 200 directly.

FIG. 12 is a schematic circuit diagram of the complementing logic 200. It comprises the circuitry for inverting the composite video image scanning code on conductor 146 from the image logic 110 (see FIGS. 3, 4, and 9) in accordance with the presence of odd fields. The complementing logic therefore causes the inversion of the video images between corresponding lines by count in odd and even fields. For example, if a certain line is transmitted in positive image in an even field, the corresponding line by count in odd field will be inverted to negative image video by the complementing logic. It will be noted that corresponding horizontal lines in each field, or lines with the same line count, will be adjacent the lines in a frame when the lines of the field are interlaced. This follows from the extensive discussion, above, concerning the counter and the field detector.

The purpose of the complementing logic 200 is to eliminate a distortion effect on the TV screen which is caused by video amplitude variations. In some television receivers, amplitude variations are possible between the horizontal lines which are processed in the normal, or positive, image and the horizontal lines which are processed in the encoded, or inverted negative image. To prevent the viewer from seeing this amplitude difference, the complementing logic, in effect, inverts the coded data signals stored in the code memory logic 150 by one-hundred eighty degrees. This inversion is only active during the presence of odd fields as commanded by the field detector. In addition, the complementing logic 200 insures that video is processed only in the normal positive image during the presence of blanking pulses or when the key switch is activated, as will be explained below.

The above described design approach using the complementing logic is necessary in accordance with certain characteristics of TV signals. The video portion of a composite television broadcast signal has been discussed in detail above, but a brief summary will again be given because of the importance of the signal with respect to the complementing logic 200. The signal transmitted by a television transmitter is referred to as the "S" signal, which comprises a fully colorplexed signal containing all of the color and luminance information of a particular scene being scanned at the broadcast studio. The S signal, as transmitted by the television transmitter, is a combination of the Y or luminance signal and the I and Q chrominance signals. In addition, there are also included in the composite signals the necessary sync and blanking pulses.

The I, Q, and Y signals are combined or modulated by the matrix of the television transmitter into the S signal, and the S signal must in turn be demodulated by the television receiver back into its component parts, the I, Q, and Y signals. The I, Q, and Y signals, after being demodulated from the S signal, are further processed into the red, green, and blue video signals which are in turn processed for selective inversion, according to the preselected code, by the unscrambling apparatus 20 of the present invention.

At a television transmitter station employing the scrambling apparatus 10, the red, green, and blue video signals are inverted (during selected horizontal lines) in accordance with the predetermined code. The inverted signals are processed by the matrix sequentially along with the uninverted or positive color horizontal lines. Accordingly, the S signal as transmitted includes processed color information in both positive and negative format. In turn, the color information processed by the receiver will include both positive and negative image color information. At the receiver, and after being processed, both the positive and the negative (or inverted) color signals are transmitted to the picture tube, thus resulting in a scrambled picture on the screen.

The unscrambling apparatus 20 decodes or unscrambles the processed color video information by reinverting the negative or encoded color signal information to provide the proper positive image polarity of color video for all horizontal lines at the picture tube.

The original video signals at the transmitter and the video signals at the receiver are both amplified in order to be transmitted and processed by the TV transmitter and the TV receiver. The various video levels of the signals should, theoretically, be amplified in a linear manner. Unfortunately, they are not so amplified. The video signals resulting from amplification at both the transmitter and the receiver include distortion due to amplification in other than a linear manner.

In some receivers, the low level video portion of a particular scene is usually not amplified in the same manner, or in the same amount, as high level video portions of the scene. Accordingly, inverting some or a consecutive group of the video lines will result in a noticeable distortion on the TV screen.

To explain further, encoded low level video signals in the nagative image would have (under normal broadcasting conditions) been processed as high level video signals in the positive image. When the unscrambling apparatus of the present invention restores the inverted or negative image video information back to positive image video information, there is a slight difference in amplitude between horizontal lines that are processed through the receiver in the encoded negative image, and horizontal lines that are processed through the receiver in the normal positive image. This is due to the fact that restored or unscrambled high level video (at the picture tube) is processed through the receiver in the nagative image as low level video and restored or unscrambled low level video (at the picture tube) is processed through the receiver in the nagative image as high level video. It can be understood that if a particular TV receiver fails to amplify low level and high level video by the same amplification factor, the restored negative image video lines will have a slightly different intensity when put on the picture tube side by side i.e., adjacent, interlaced lines, with nonencoded video lines which are processed in the normal positive image by the receiver.

It should be noted that the distortions described herein are not the result of the present invention. Rather, these distortions are already an inherent problem with television transmitters and receivers, and the distortion is accordingly built into television equipment. The video inversion or scrambing technique employed by the present invention contrasts such distortions and may possibly make these inherent distortions discernible on a TV screen. The complementing apparatus included in the present invention will prevent the "built-in" distortions from being noticeable on the receiver screens as discussed in further detail below.

It has been discussed above that there are 65,536 possible codes or combinations which may be employed using the counting sequence of sixteen horizontal lines. Under such circumstances, there may be several consecutive lines transmitted encoded in negative image. This type situation contrasts or emphasizes the distortion discussed above. However, the complementing logic eliminates such distortions by inverting the images of corresponding lines by count, as discussed above, between odd and even fields. The intensity contrast is substantially eliminated due to an averaging effect on the screen. This averaging effect may even improve color fidelity for some receivers. The complementing logic accomplishes the above averaging by causing all horizontal lines to be transmitted equally in positive image and negative image. This is accomplished by inverting the composite video image scanning code on conductor 146 during odd fields.

The complementing logic 200 includes two NAND-gates, two OR-gates, and two signal inverters. The output of the complementing logic on conductor 262 is transmitted to the video inverters 300, 302, and 304 (see FIGS. 3, 4, and 13). The NAND-gates are the inverting type. That is, when they are qualified in the NAND function, all inputs are high level signals and the outputs are low level signals. The OR-gates are non-inverting, and when qualified in the OR function, a low signal at either or both inputs results in a low output.

An inverter 210 receives a signal on conductor 56 from the field detector 40. The field detector output is also transmitted to NAND-gate 250 by conductor 256 which connects with the conductor 56.

Another inverter 220 receives the composite image scanning code on conductor 146 from the positive or negative image decision logic 110. The image scanning code signal is also transmitted to an input of NAND-gate 250 by conductor 246, which connects with the conductor 146.

The outputs from the inverters 210 and 220 comprise two of the three input signals to NAND-gate 240 on conductors 212 and 222, respectively.

Two other inputs to the complementing logic 200 are transmitted to an OR-gate 230 on conductors 199 and 206. The output from OR-gate 230 is transmitted on conductor 232 to one input of an NAND-gate 250 and, by a conductor 234, to one input of the NAND-gate 240. The conductor 234 extends from the conductor 232. The output of the OR-gate 230 accordingly comprises the third input to the NAND-gates 240 and 250. The other two inputs to each NAND gate are comprised of the field detector signals and the image scanning code signals as discussed above. The output signals of the NAND-gates 240 and 250 are transmitted to OR-gate 260 by conductors 242 and 252 respectively. The OR-gate 260 in turn transmits the output of the complementing logic on conductor 262 to the inputs of the video inverters. (See FIGS. 3, 4, and 13.) This is the signal that finally establishes whether video is to be scrambled or unscrambled in the inverted or non-inverted form.

The resulting signal on conductor 262 is a composite signal representing the sequential video polarity codes for each horizontal line in a sixteen line group as discussed above. The signals represent the pre-determined polarity for each line as determined by the code memory logic 150. However, the polarity of each line at the complementing logic output on conductor 262 will either be in phase with the data from the code memory logic or 180 degrees out of phase, depending on whether an odd or an even field is present from the field detector. Actually, each of the four input signals to the complementing logic 200 has a certain priority for control of the video polarity on conductor 262.

The inputs to OR-gate 230 take priority over the image scanning code signal on conductor 146. The inputs to the OR-gate 230 comprise signals on a pair of conductors 199 and 206. Conductor 199 extends from the output of the blanking pulse detector and conductor 206 extends from a key switch. (See FIGS. 3, 4, and 10). A low signal from the key switch 204 on conductor 206 and/or a low signal from the blanking pulse detector 180 on conductor 199 through the OR-gate 230 will take priority over the image scanning code signal on conductor 146 and force a high output from the complementing logic on conductor 262. This in turn instructs the video inverters (see FIGS. 3, 4, and 13) to pass positive image video only. This feature is necessary to insure that the blanking and sync pulses will always be transmitted and unscrambled in the positive image. Also, the key switch signal on conductor 206 causes the scrambler 10 and unscrambler 20 of the present invention to work in the positive video mode only as discussed above for non-subscriptive programs. A low or grounding signal on either or both conductors 199 and 206 indicates that the video signals should be transmitted or unscrambled in positive image and the complementing logic output on conductor 262 is accordingly a high level signal.

The image scanning code signal to be complementing logic 200 on conductor 146 comprises the sequentially ANDed output signals from the decoder 96 and the memory logic 150. This output from the positive or negative image decision logic initially determines which video signals, or horizontal lines, are to be inverted and which are to be positive or normal. However, with the modification from the field detector 40 output, the instructions from the positive or negative image decision logic apparatus 110 are modified by the complementing logic 200. A high input from the field detector 40 on conductor 56 causes the inversion of the image scanning code signal on conductor 146 during the odd fields as explained in detail below.

If the field detector 40 output is low, as during an even field, then the NAND-gate 250 is disqualified by the low signal on conductor 256 from conductor 56. At the same time, the low output from the field detector on conductor 56 is inverted by the inverter 210 and is thus transmitted on conductor 212 as a high level signal to NAND-gate 240. This signal comprises the first of two qualifying signals to NAND-gate 240.

The second qualifying signal required to qualify the NAND-gate 240 is from the OR-gate 230. When the signal on conductors 232 and 234 is a high level signal, the NAND-gate 240 is qualified to act as an inverter to the video image scanning code signal coming from the inverter 220 on conductor 222. The scanning code signal, under the above conditions, is transmitted to OR-gate 260 on conductor 242. From the output of OR-gate 260 it is sent to command the video inverters via conductor 262. However, because of the double inversion of the scanning code signal, one inversion by inverter 220 and one inversion by NAND-gate 240, the net inversion at the complementing logic output on conductor 262 is zero or unchanged from the original polarity present at the input on conductor 146.

When the field detector output is high, as during an odd field, the reverse situation occurs. That is, the high signal on conductor 56 will be inverted by the inverter 210 and will disqualify the NAND-gate 240 with a low signal on conductor 212, while the high signal on conductors 56 and 256 comprises one of the two signals necessary to qualify AND-gate 250. The second qualifying signal is from the OR-gate 230 on conductor 232. This signal under normal conditions, with key-switch 204 off or a blanking pulse not present, is a high level signal. NAND-gate 250, qualified by the high signals from the field detector on conductor 256 and the OR-gate 230 on conductor 232, now acts as an inverter to the video image scanning code signal coming from the positive or negative image decision logic on conductors 146 and 246.

Thus the inverting of the video image scanning code on conductor 146 is accomplished at NAND-gate 250 during the time the NAND-gate 240 is disqualified by the low level field detector signal on conductor 212. The inverted image scanning code information is then sent from the output of NAND-gate 250 on conductor 252 to the input of OR-gate 260. From the output of OR-gate 260, the signal is transmitted to command the video inverters on conductors 262. See FIGS. 3, 4, and 13. If the image scanning code signal on conductor 146 is transmitted through NAND-gate 240 during an even field, it will not be inverted. But if the scanning code signal is transmitted through NAND-gate 250 during odd field, the scanning code signal will be inverted. Which NAND-gate the signal is sent through, either NAND-gates 240 or 250, is determined by the signal level from the field detector 40 on conductor 56. A high level signal (during odd field) from the field detector 40 on conductor 56 causes the image scanning code signal on conductor 146 to be routed through NAND-gate 250. A low level signal during an even field on conductor 56 results in the image scanning code signal being routed through NAND-gate 240. By inverting the image scanning code signal at conductor 262 between odd and even field, the complementing logic substantially eliminates possible intensity distortions on the receiver screen, as discussed above.

A low level signal present from either the key switch 204 on conductor 206 or the blanking pulse detector 180 on conductor 199 will always take precedence over the signals present on conductors 56 and 146. Such a low level signal present on either or both conductors 199 and 206 result in both NAND-gates 240 and 250 being disqualified. This condition assures high level signals from the outputs of both NAND-gates and will result in a high level signal being transmitted to the video inverters on conductor 262. This in turn instructs the video inverters to pass only positive image video when the key switch 204 is on or when a blanking pulse is present. In effect, the scrambling and unscrambling apparatus of the present invention works in the non-subscription mode when either a blanking pulse is present or the key switch 204 is activated or grounded. No means is shown in FIG. 13 for controlling the gain of amplifier 380. Since various types of feedback systems are available and well known in the art for controlling the gain for such amplifiers, no feedback network has been shown.

In summary, the complementing logic removes possible discernible distortion on the TV screen as discussed above. The field detector 40 and the complementing logic 200 together cause all horizontal lines to be equally transmitted in positive and negative image, either in odd or even fields. This results in averaging the distortion on the screen between all lines. Thus distortions present in the normal television broadcasting are not contrasted by the negative or inverted image scrambling format of the present invention. A pleasing, pure picture results. Although each line is transmitted equally in the negative and positive image, the order in which lines are inverted is according to the code stored in the memory logic 150.

The complementing logic is, in effect, a double encoding-decoding system. In the transmitting or encoding system, under the control of the code memory logic, a predetermined code causes the video information for certain lines in each repetitive group of sixteen horizontal lines to be inverted during even fields. During odd fields, the complementing logic reverses or inverts the commands of the code memory logic to invert the video information of the other lines in each repetitive group of sixteen lines.

At the receiver, the code memory logic again causes the inversion of the video information for certain lines in each repetitive group of sixteen lines during even fields, thus restoring those certain lines to their original polarity prior to the first inversion at the transmitter. During odd fields, the complementing logic of the receiver apparatus reverses or inverts the commands of the code memory logic and causes the opposite inversion of the odd field lines in each repetitive group of sixteen lines, thus restoring the original polarity of the odd lines. The net result is a positive image restoration of the polarity of all lines in both fields after essentially a double encoding, comprising a first encoding during even fields and a second and opposite encoding during odd fields.

Figure 13:
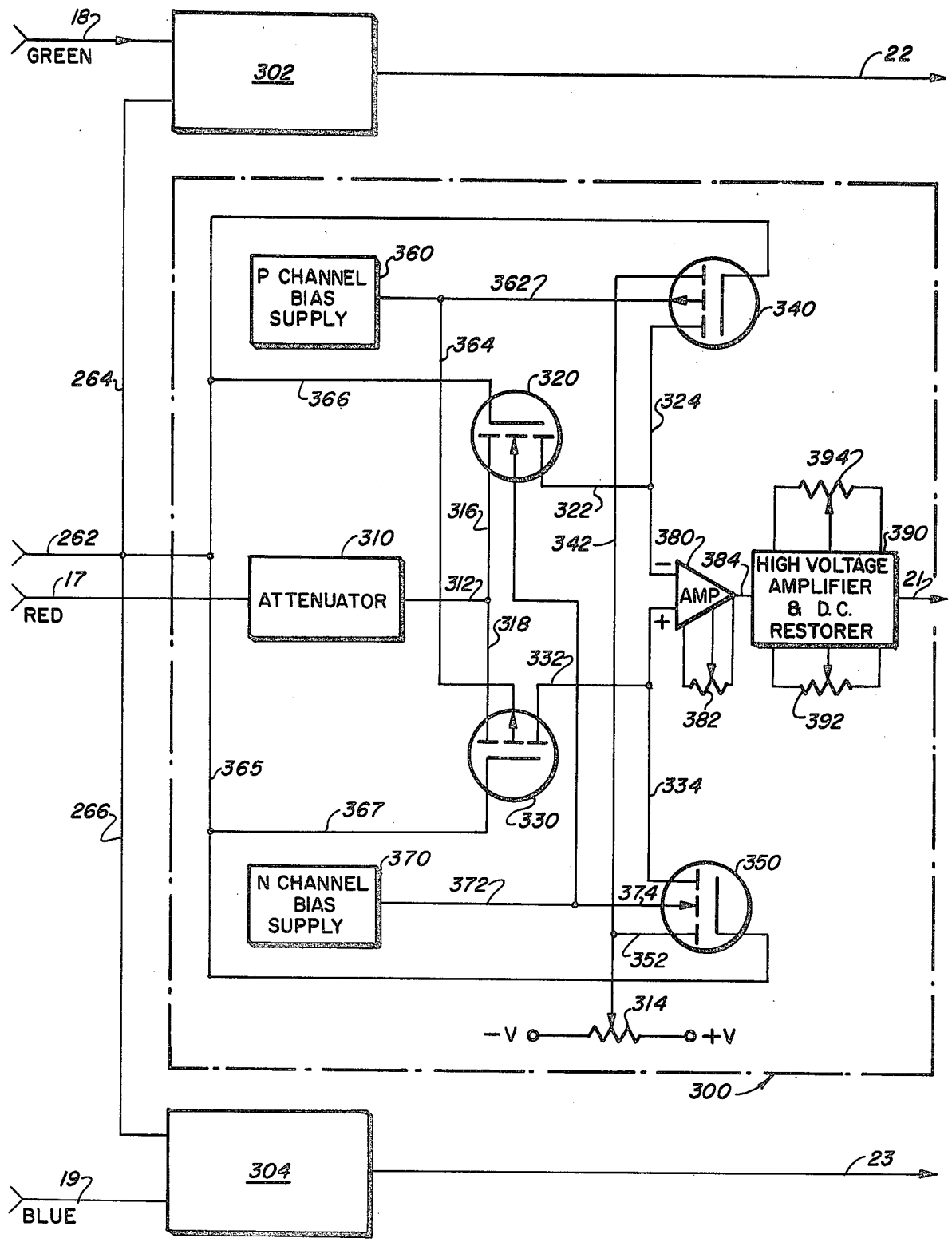
FIG. 13 is a schematic circuit diagram of video inverter apparatus incorporated into the present invention.

FIG. 13 is a schematic circuit diagram of the video inverter apparatus 300. Included in the Figure are three inverters 300, 302, and 304. Only inverter 300 is schematically illustrated in FIG. 13, and video inverters 302 and 304 are shown as blocks. Three inverters are required for the apparatus of each scrambling system or unit, and three for each unscrambling system or unit. One inverter is required for each video color signal in a particular system or unit, one inverter for red, one inverter for green, and one inverter for blue. For illustrative purposes herein, the circuitry for only inverter 300 is shown in FIG. 13, and it will be discussed in the environment of the video unscrambling apparatus 20, illustrated in FIGS. 2 and 4.

The video inverter 300 illustrated is for the color red, and accordingly a single input conductor 17 is shown as one of the two inputs to the apparatus. The other two inverters 302 and 304, for the green and blue video, respectively, are identical to the inverter 300. However, each inverter includes a separate video input and output, as shown in FIG. 2, for the respective colors. Conductors 18 and 22 comprise respectively the input and output conductors for the green video inverter 302, while conductors 19 and 23 comprise respectively the input and output conductors for the blue video inverter 304.

The second input to the video inverters 300, 302, and 304, comprise the output signal from the complementing logic on the respective conductors 262, 264, and 266. The output from the complementing logic tells the video inverter which video lines should be inverted, and the inversion commands are the same for all three inverters. The conductor 262 extends to inverter 300, while conductors 264 and 266 extend from conductor 262 to inverters 302 and 304, respectively.

The operation of each of the inverters is the same, and will be explained for inverter 300. By application of a differential input video amplifier 380, the video inverter 300 performs the ultimate job of inverting the color video for each horizontal line which is to be inverted. The video signals are either inverted or not inverted, depending on which amplifier input, the positive or negative, they are routed to by command of the complementing logic 200.

The inverter consists of six main components, the first of which is an attenuator 310. The conductor 17 transmits red video information whether positive or negative, to the attenuator 310. The attenuator is a well known element which decreases the amplitude of the input signal so that the signal may be appropriately processed by a video amplifier 380, to which the input color signal is sent. The attenuator includes resistors in series with parallel capacitors for appropriate attenuation and coupling of the higher frequencies with a minimum of distortion.

The video amplifier 380 includes two inputs, a positive input and negative input. The two inputs comprise a differential input stage to the amplifier 380, which is well known in the art. The signal to the video amplifier 380 is amplified inverted or not inverted according to whether the video input is to the positive or the negative input terminal. That is, if the video signal to the amplifier is by way of the positive input terminal, the input signal is amplified in a non-inverted positive manner. If the video to the amplifier is by way of the negative terminal, the resulting output of the amplifier will be an inverted or negative output signal on conductor 384 relative to the input signal at the negative input terminal.

A potentiometer 382 is connected to the video amplifier 380 to allow for balancing the amplitude between the inverted and non-inverted video. The potentiometer 382 insures that the inverted and non-inverted video lines are of substantially equal amplitude at the output of the amplifier on conductor 384.

From the video amplifier 380, the red video signal is transmitted to the input of a high voltage amplifier and dc restorer 390 by conductor 384. The high voltage amplifier amplifies the video signal back to the amplitude originally present on conductor 17 prior to the attenuator. The signal amplitude is adjusted by a potentiometer 392 of the amplifier 390. The purpose of the dc restorer is to put back the dc component of the video signal which was removed by the differential input of amplifier 380 as discussed in further detail below.

Two enhancement mode metal oxide semiconductor field effect transistors (mosfets) are used in pairs for switches in routing the video signal from the attenuator 310 to either the positive or the negative input terminal of the video amplifier 380. One mosfet is a P channel mosfet and one is an N channel mosfet, respectively designated 330 and 320. A second pair of mosfets, including a P channel mosfet 340 and an N channel mosfet 350 are also connected together for appropriate switching of a dc reference voltage to the input of amplifier 380. The four mosfets will hereinafter be referred to simply as switches.

Switch 320 is connected to the negative input terminal of the video amplifier 380 by conductors 322 and 324 while switch 330 is connected to the positive input terminal of the video amplifier by conductors 332 and 334 for switching the video. Switch 340 provides a dc reference for the negative input terminal of the video amplifier by conductor 324, and switch 350 provides a dc reference on conductor 334 for the positive input terminal of the video amplifier. The dc reference is supplied to the terminal opposite the terminal to which the video is supplied from the attenuator. The dc reference effectively eliminates the dc component of the video signal from the attenuator due to the differential input action of the amplifier 380.

The dc reference voltage of the switches 340 and 350 is from a potentiometer 314. The potentiometer 314 is adjusted to a voltage equal to the dc component of the video signal after the attenuator 310. This dc component corresponds to the middle of the dynamic range of the luminance signal for the transmitter. This effectively cancels out the dc component of the video due to the differential input of the amplifier. This happens because the reference voltage is fed to the opposite terminal from which the video is connected from the attenuator. The reference is thus provided to switch 340 from the center tap of potentiometer 314 by way of conductor 342 and to switch 350 from the center tap of potentiometer 314 by way of conductor 352 which is connected to conductor 342. The potentiometer 314 has one end terminal connected to a positive voltage supply and one end terminal connected to a negative voltage supply.

The inverting command input to the video inverter 300 from the complementing logic is transmitted on conductor 262, and the input on conductor 262 is transmitted to the gate electrode of each of the four switches of the inverter. Conductor 262 extends directly to the gate of switch 340. Conductor 365 is connected to conductor 262 and it extends to the gate of switch 350. Conductors 366 and 367 extend from conductors 262 and 365 to the gates of the switches 320 and 330, respectively. Thus the input from the complementing logic is coupled to the gates of the four switches.

An appropriate bias supply is provided for the substrate of each of the switches, with a bias supply 360 providing a bias for the substrate of the two P channel mosfet switches 340 and 330, and a bias supply 370 providing a bias for the substrate of the N channel mosfet switches 320 and 360. A conductor 362 connects the bias supply 360 to the substrate of switch 340. A conductor 364 is connected to conductor 362 and extends to the substrate of switch 330. Another conductor 372 connects the bias supply 370 to the substrate of switch 320, and a conductor 374 is connected to the conductor 372, connecting the bias supply 370 to the substrate of switch 350. The bias supplies are necessary in order to insure that the switches 320, 330, 340, and 350 switch or turn on and off at gate voltages which are independent of the video level being switched between the drain and source of each switch.

Positive or negative image red video information is transmitted to the attenuator 310 on the conductor 17 and the red input video signal, which is too high for the amplifier 380 to work with, is appropriately attenuated to a workable level by the attenuator. The output from the attenuator is transmitted on conductor 312 to the source terminal of the switches 320 and 330. A conductor 316 extends from conductor 312 to the switch 320, and a conductor 318 extends from the conductor 312 to the switch 330.

A positive or high level input signal from the complementing logic on conductor 262 causes switches 320 and 350 to turn on and switches 330 and 340 to turn off. With switch 350 on, the positive input terminal to the video amplifier 380 is connected to the reference voltage of potentiometer 314 by way of conductors 342, 352, through the switch 350, and conductor 334. Accordingly, the video information from the attenuator 310 is transmitted via conductors 312, 316, and switch 320, to the negative input terminal of the video amplifier 380 on conductors 322 and 324. With the red video from the attenuator going to the negative input of the video amplifier, the red output signal from the video amplifier 380 on conductor 384 will be inverted and 180 degrees out of phase with the signal from the attenuator 310. In other words, if the input to the attenuator is negative video information, the output from the video amplifier will be positive and out of phase with the video signal transmitted by the attenuator, provided a positive or high level input signal is transmitted on conductor 262 from the complementing logic 200.

If the command input from the complementing logic on conductor 262 is a negative or a low level signal, then switches 300 and 340 will be turned on, and switches 320 and 350 will be turned off. With switch 340 turned on, the negative input terminal to the video amplifier 380 is connected to the reference voltage of potentiometer 314 by way of conductor 342, the switch 340, and conductor 324. The red video output of the attenuator 310 is accordingly transmitted through switch 330 to the positive input terminal of the video amplifier 380 by conductors 312, 318, 332, and 334.

When the video input signal to the amplifier 380 is to its positive terminal, the output of the video amplifier is not inverted and is accordingly in phase with the output from the attenuator 310. Therefore, if the output from the attenuator is positive going, the output from the amplifier 380 will be a positive going signal, and if the output from the attenuator is negative going, the output from the video amplifier will be a negative going signal.

The output from the video amplifier on conductor 384 is in phase with the output from the attenuator on conductor 312 providing a negative or low level input signal is transmitted on conductor 262 from the complementing logic. The video information is transmitted from the video inverter 300 on conductor 21 either inverted or not inverted with respect to the input signal on conductor 17, depending on the command input from the complementing logic on conductor 262.

The video amplifier 380 is a dual differential input video amplifier and is designed to work in the dc as well as the video frequency range. The dual input differential amplifier is a well known component, and can be designed by anyone skilled in the art. Any input video signal on the negative input terminal will be inverted 180 degrees at the output. Any input signal to the positive terminal will be in phase, or not inverted, at the output. The $V_{cc}$ supply is positive relative to ground and the $V_{ee}$ is negative relative to ground, thus giving the video amplifier output an appropriate working range above and below ground. As indicated above, the potentiometer 382 balances the inverted and not inverted signals, as is well known in the art.

The high voltage amplifier and dc restorer 390 work together to restore the video at conductor 21 to the same amplitude and dc reference originally present on conductor 17. The only difference is that the video portion of the signal at conductor 21, exclusive of the dc component, may or may not be inverted by 180 degrees, depending on the input command from the complementing logic on conductor 262. The element 390 is well known in the art and is an integral part of all TV receivers.

It is understood that the element 390 inverts video information 180 degrees from its input. The input signal on conductor 384 is out of phase with its output on conductor 21. Therefore, in order for the video inverter 300 to invert video signals between input conductor 17 and output conductor 21, the inverting command from the complementing logic on conductor 262 must be a low level signal. This results in the video being routed to the positive or non-inverting input of amplifier 380. The inversion is accordingly accomplished by element 390.

The potentiometer 392 adjusts the video amplitude on conductor 21 to equal the amplitude on conductor 17. The dc output level at conductor 21 is adjustable by the potentiometer 394, which provides an appropriate reference drive to the dc restorer element in 390. The dc restorer is a well-known component which superimposes video information onto a static dc voltage level.

The output of the element 390 is transmitted on conductor 21 directly to a picture tube grid, replacing the red video color information on conductor 17. Decoded or restored positive image red video information is transmitted on conductor 21 to the picture tube. This is also shown in FIG. 2. The video amplifiers 302 and 304 are used in the same manner as described above for unscrambling or decoding both the green and the blue video information or signals in the unscrambling apparatus 20.

The primary difference between the video inverters in the scrambling or encoding apparatus 10 and the video inverters in the unscrambling or decoding apparatus 20 is that in the encoding apparatus the video signal transmitted to the attenuator is a positive signal from the television cameras. In the decoding apparatus, as stated above, the input to the attenuator may be either positive or negative color video in its scrambled or encoded form from the television chassis. However, if the proper code is employed by the decoding apparatus 20, the three video signals to the picture tube on conductors 21, 22, and 23, will be unscrambled and presented in the normal positive image for all horizontal lines.

There are, of course, other approaches to inverting the video information. The use of a differential input amplifier allows low level signals to be switched, which appears to be the most desirable approach.

What is claimed is:

1. Apparatus for scrambling video information in a television signal having a frame with a first field and a second field of interlaced horizontal lines and horizontal and vertical timing information, comprising, in combination:

counter means for counting horizontal lines;
means for inverting video information in selected horizontal lines in the first field of the frame; and
complementing means for inverting video information in horizontal lines in the second field of the frame corresponding by count to the lines not selected for inversion in the first field, including
first logic circuit means for determining horizontal lines in the second field corresponding by count to the lines selected for inversion in the first field, and means for preventing the inversion of the video information in horizontal lines in the second field with the same counts as lines selected for inversion in the first field,
second logic circuit means for determining horizontal lines in the second field corresponding by count to the lines not selected for inversion in the first field, and
means for inverting video information in horizontal lines corresponding by count in the second field to lines not selected for inversion in the first field.

2. The apparatus of claim 1 in which the means for inverting video information in selected horizontal lines in the first field includes means for sensing horizontal timing information, and the counter means includes means for sequentially counting the horizontal timing information for counting horizontal lines in the first field and in the second field of the television signal.

3. The apparatus of claim 2 in which the counter means includes means for resetting the counter means at the end of the first field and at the end of the second field.

4. The apparatus of claim 3 in which the means for resetting the counter means includes means for sensing vertical timing information.

5. The apparatus of claim 4 in which the means for inverting video information further includes field detector means for detecting the beginning of a field of horizontal lines in the television signal.

6. The apparatus of claim 5 in which the field detector means includes means for measuring the time interval between the horizontal timing information and the vertical timing information to sequentially define the beginning of a first field of horizontal lines and a second field of horizontal lines.

7. The apparatus of claim 2 in which the means for inverting video information in selected lines in the first field further includes code means for selecting horizontal lines in the first field for inversion.

8. The apparatus of claim 2 in which the counter means includes means for counting horizontal lines in groups in the first field and in the second field of the television signal.

9. The apparatus of claim 8 in which the means for inverting video information further includes code means for selecting horizontal lines in each group of horizontal lines counted by the counter means for inversion in the first field of the television signal.

10. The apparatus of claim 1 in which the means for inverting video information further includes means for detecting blanking pulses in the television signal and for preventing the inversion of the detected blanking pulses.

11. Apparatus for encoding video information in horizontal lines of a television signal having a first field and a second field of interlaced horizontal lines, horizontal and vertical timing information, and a dc component, comprising, in combination:

timing means for sensing horizontal timing information and vertical timing information;
field detector means for detecting the first field and the second field of horizontal lines in the television signal from the horizontal and vertical timing information;
counter means for counting horizontal lines in the first field of horizontal lines and for counting horizontal lines in the second field of horizontal lines in response to horizontal timing information;
code logic means for selecting a first plurality of lines from the counted horizontal lines in the first field;
complementing means for selecting a second plurality of lines in the second field corresponding by count to the lines not selected as the first plurality of lines; and
video inverter means for inverting video information in the first plurality of horizontal lines in the first field and for inverting video information in the second plurality of lines in the second field, including
first switch means for selecting the first plurality of lines for inversion in the first field, and
second switch means for selecting the second plurality of lines for inversion in the second field.

12. The apparatus of claim 11 in which the video inverter means includes means for detecting blanking pulses and for preventing the inversion of the blanking pulses.

13. The apparatus of claim 11 in which the counter means includes means for counting lines in groups in the first field and in the second field.

14. The apparatus of claim 13 in which the counter means further includes means for resetting the counter means at the end of each field.

15. The apparatus of claim 13 in which the code logic means includes means for selecting a first plurality of lines in each group of lines counted by the counter means in the first field and in the second field.

16. The apparatus of claim 15 in which the complementing logic means includes means for selecting a second plurality of lines in each group of lines in the first field and in the second field, the second plurality comprising lines corresponding to the counts of all lines not selected in the first plurality of lines.

17. The apparatus of claim 16 in which the video inverter means includes means for inverting the video information in the first plurality of lines in each group in the first field and for inverting the video information in the second plurality of lines in each group in the second field.

18. The apparatus of claim 11 in which the inverter means includes means for adjusting the dc component in the television signal to prevent inverting the dc component in the video information.

19. In a television receiver for receiving a television signal having a frame of two fields of interlaced lines, including a chassis, a picture tube, and a plurality of conductors extending between the chassis and the picture tube for transmitting amplified video information from the chassis to the picture tube, apparatus for unscrambling amplified video information in the television signal, comprising, in combination:

timing means, including means for sensing horizontal timing information;

counter means for counting horizontal lines in each field of the television signal in response to horizontal timing information;

code logic means for selecting a first plurality of horizontal lines for inversion in a first field from the counted horizontal lines;

complementing means including logic means for selecting a second plurality of horizontal lines for inversion in a second field, the second plurality of lines comprising the lines corresponding by count to the lines not selected for inversion in the first field; and means for inverting the video information of the first plurality of horizontal lines in the first field and of the second plurality of horizontal lines in the second field.

20. The apparatus of claim 19 in which the timing means further includes means for sensing vertical timing information.

21. The apparatus of claim 20 in which the complementing means includes field detector means for detecting the first field and the second field in response to the timing means.

22. Apparatus for decoding encoded video information in a television signal having a dc component, comprising, in combination:

timing means, including means for sensing horizontal timing information;

field detector means for detecting a first field of horizontal lines of video information and a second field of horizontal lines of video information in the television signal;

counting means for counting horizontal lines of video information in response to horizontal timing information in the first field and in the second field;

code logic means for selecting horizontal lines for the inversion of video information from the lines counted in the first field;

complementing means, including logic means responsive to the field detector means, for selecting horizontal lines for the inversion of video information therein from the lines counted in the second field corresponding by count to the lines not selected by the code logic means for inversion in the first field; and means for inverting the video information of the selected lines in the first and second fields.

23. The apparatus of claim 22 in which the counting means includes means for counting horizontal lines in groups in the first field and in the second field.

24. The apparatus of claim 22 in which the timing means includes means for sensing vertical timing information.

25. The apparatus of claim 24 in which the field detector means includes means for detecting the first field and the second field in response to the horizontal and vertical timing information.

26. The apparatus of claim 22 in which the inverting means includes means for adjusting the dc component in the television signal to prevent inverting the dc component in the video information.

* * * * *